United States Patent
Asakura et al.

(10) Patent No.: US 10,572,203 B2
(45) Date of Patent: Feb. 25, 2020

(54) NON-TRANSITORY COMPUTER-READABLE RECORDING MEDIUM STORING COMPUTER-READABLE INSTRUCTIONS FOR ESTABLISHING WIRELESS CONNECTION BETWEEN TERMINAL DEVICE AND COMMUNICATION DEVICE

(71) Applicant: BROTHER KOGYO KABUSHIKI KAISHA, Nagoya-shi, Aichi (JP)

(72) Inventors: Hirotaka Asakura, Nagoya (JP); Longlong Ruan, Nagoya (JP)

(73) Assignee: BROTHER KOGYO KABUSHIKI KAISHA, Nagoya-Shi, Aichi (JP)

(*) Notice: Subject to any disclaimer, the term of this patent is extended or adjusted under 35 U.S.C. 154(b) by 0 days.

(21) Appl. No.: 15/937,979

(22) Filed: Mar. 28, 2018

(65) Prior Publication Data

US 2018/0285035 A1    Oct. 4, 2018

(30) Foreign Application Priority Data

Mar. 31, 2017 (JP) .................. 2017-071584

(51) Int. Cl.
*G06F 3/12* (2006.01)
*H04M 1/725* (2006.01)
(Continued)

(52) U.S. Cl.
CPC .......... *G06F 3/1292* (2013.01); *G06F 3/1208* (2013.01); *G06F 3/1209* (2013.01);
(Continued)

(58) Field of Classification Search
CPC ................................................. G06F 3/1292
See application file for complete search history.

(56) References Cited

U.S. PATENT DOCUMENTS

2013/0260683 A1    10/2013    Suzuki et al.
2014/0176981 A1    6/2014    Asai
(Continued)

FOREIGN PATENT DOCUMENTS

JP    2013214804 A    10/2013
JP    2014127819 A    7/2014
(Continued)

OTHER PUBLICATIONS

Wi-Fi Alliance, "Wi-Fi Peer-to-Peer (P2P) Technical Specification version 1.5", Aug. 4, 2014 (Aug. 4, 2014), pp. 1-183, Retrieved from the Internet <URL:https://www.wi-fi.org/downloads-registered/Wi-Fi_P2P_Technical_Specification_v1.5.pdf> [retrieved Dec. 9, 2015].

*Primary Examiner* — Nicholas Pachol
(74) *Attorney, Agent, or Firm* — Scully Scott Murphy and Presser

(57) ABSTRACT

In a case where a specific wireless connection is established between a terminal device and a communication device under a state where a first wireless connection not via an access point is being established between the terminal device and the communication device, the terminal device may determine whether the first wireless connection is a wireless connection according to a first communication scheme or a wireless connection according to a second communication scheme, and supply a predetermined instruction to an OS (abbreviation of Operating System) program of the terminal device in a case where it is determined that the first wireless connection is the wireless connection according to the first communication scheme. The predetermined instruction may include an instruction for disconnecting the first wireless connection and an instruction for establishing a second wireless connection
(Continued)

according to the second communication scheme between the terminal device and the communication device.

9 Claims, 10 Drawing Sheets

(51) Int. Cl.
    *H04W 4/80* (2018.01)
    *H04W 76/30* (2018.01)
    *H04W 76/10* (2018.01)

(52) U.S. Cl.
    CPC ........ *G06F 3/1286* (2013.01); *H04M 1/7253* (2013.01); *H04W 4/80* (2018.02); *H04W 76/10* (2018.02); *H04W 76/30* (2018.02); *G06F 3/1231* (2013.01)

(56) References Cited

U.S. PATENT DOCUMENTS

| | | | | |
|---|---|---|---|---|
| 2014/0179317 A1* | 6/2014 | Tanaka | ................ | H04W 60/00 455/435.2 |
| 2015/0092601 A1* | 4/2015 | Ando | .................... | H04W 76/10 370/254 |
| 2015/0092607 A1* | 4/2015 | Ando | .................. | H04L 41/0893 370/255 |
| 2015/0093992 A1* | 4/2015 | Tanaka | ................ | H04B 5/0031 455/41.2 |
| 2015/0189023 A1 | 7/2015 | Kubota et al. | | |
| 2015/0304805 A1 | 10/2015 | Suzuki et al. | | |
| 2016/0253135 A1 | 9/2016 | Kubota et al. | | |
| 2016/0286343 A1* | 9/2016 | Terashita | ................ | H04W 4/80 |
| 2016/0286344 A1* | 9/2016 | Terashita | ........... | H04N 1/33346 |
| 2017/0086237 A1* | 3/2017 | Ando | .................... | H04W 8/005 |
| 2017/0094441 A1* | 3/2017 | Terashita | .......... | H04M 1/72519 |
| 2017/0195948 A1 | 7/2017 | Tanaka | | |
| 2017/0208431 A1 | 7/2017 | Suzuki et al. | | |

FOREIGN PATENT DOCUMENTS

| | | |
|---|---|---|
| JP | 2014127871 A | 7/2014 |
| JP | 2015126501 A | 7/2015 |

* cited by examiner

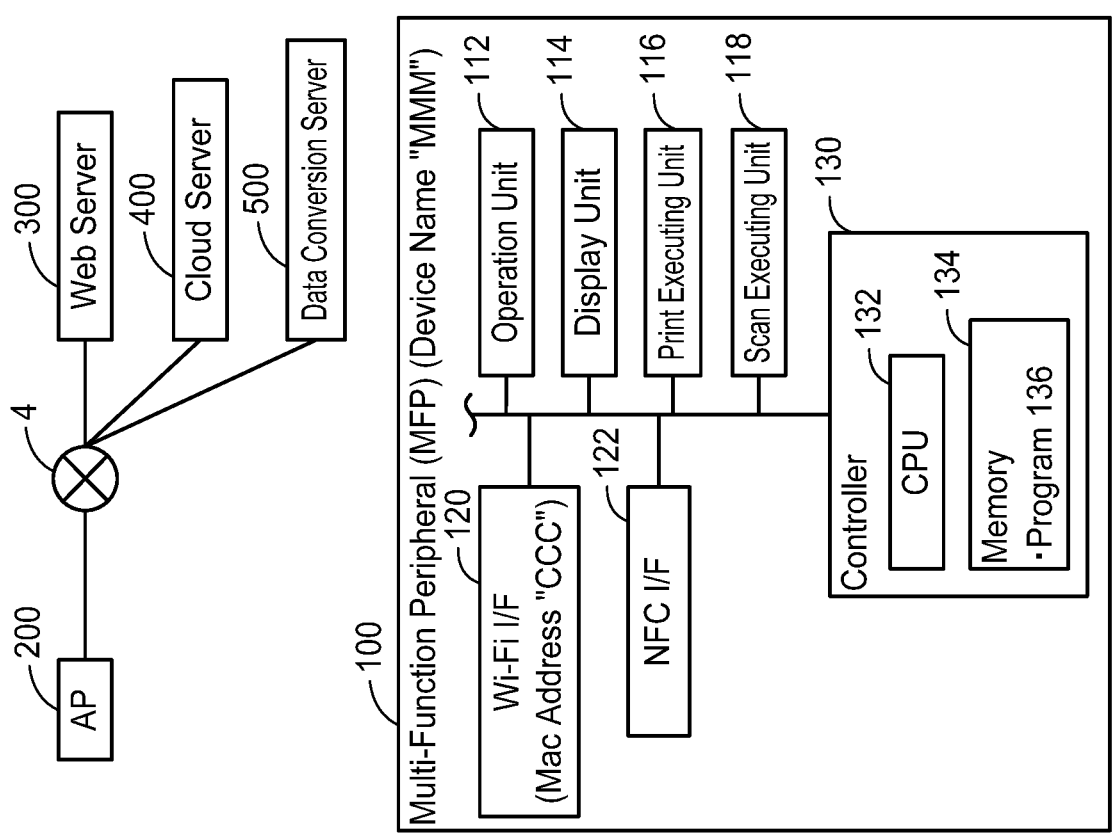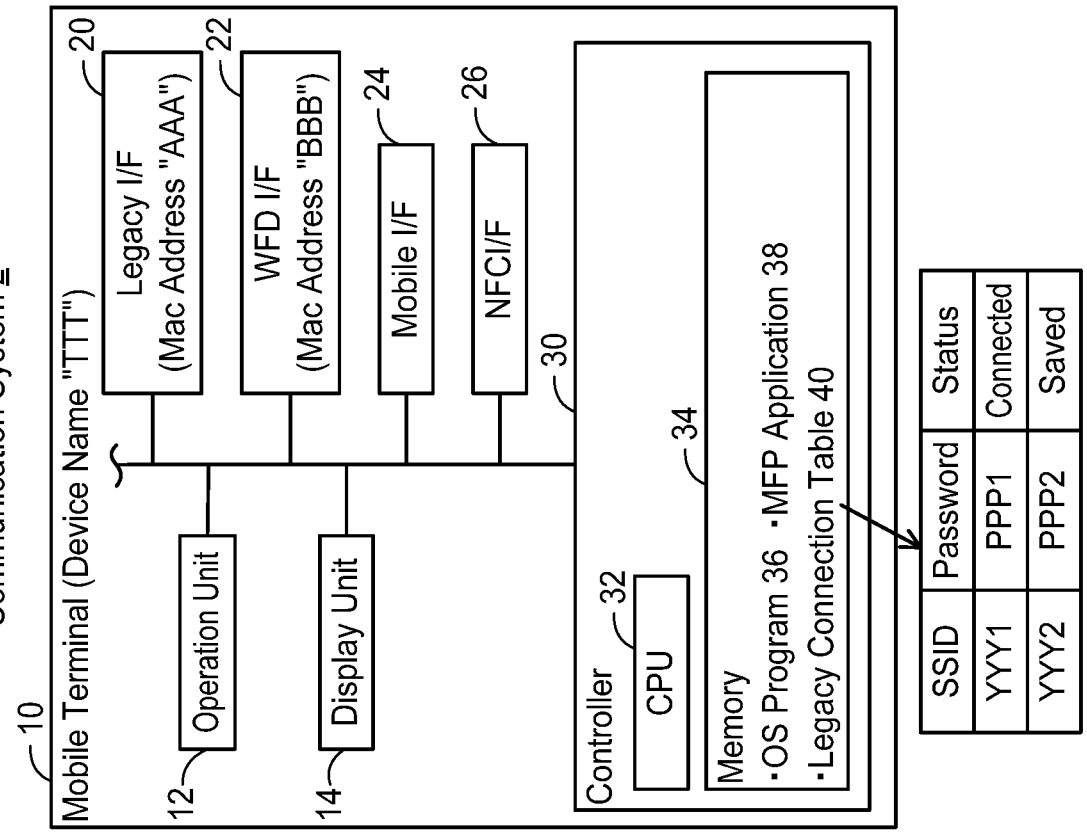
FIG. 1

FIG. 7 (Case D)

FIG. 8 (Continuation of FIG. 7)

NON-TRANSITORY COMPUTER-READABLE RECORDING MEDIUM STORING COMPUTER-READABLE INSTRUCTIONS FOR ESTABLISHING WIRELESS CONNECTION BETWEEN TERMINAL DEVICE AND COMMUNICATION DEVICE

TECHNICAL FIELD

The present application discloses a technique for establishing a wireless connection between a terminal device and a communication device.

BACKGROUND ART

A communication system comprising an MFP (abbreviation of Multi-Function Peripheral), a mobile terminal, and an access point is known. In a case where an NFC (abbreviation of Near Field Communication) communication session with the MFP is established under a state where a normal Wi-Fi connection not via the access point is established between the mobile terminal and the MFP, the mobile terminal executes a data communication process with the MFP using the normal Wi-Fi connection. Here, the normal Wi-Fi connection is a Wi-Fi connection (a so-called legacy connection) that is not a WFD connection according to a WFD (abbreviation of Wi-Fi Direct (registered trademark)) scheme.

SUMMARY

In the above technique, no consideration is given to the mobile terminal establishing another wireless connection with the MFP, instead of the legacy connection with the MFP.

In the present application, a technique is disclosed for easily switching from a state where a legacy connection between a terminal device and a communication device is being established to a state where another wireless connection is being established therebetween.

A non-transitory computer-readable recording medium storing computer-readable instructions for a terminal device is disclosed in the present disclosure. The computer-readable instructions, when executed by a processor of the terminal device, may cause the terminal device to: in a case where a specific wireless connection is established between the terminal device and a communication device via a specific wireless interface of the terminal device under a state where a first wireless connection not via an access point is being established between the terminal device and the communication device, determine whether the first wireless connection is a wireless connection according to a first communication scheme or a wireless connection according to a second communication scheme, wherein the first communication scheme is for participating, as a legacy of a Wi-Fi scheme, in a target wireless network in which the communication device operates as a parent station, the wireless connection according to the first communication scheme is established via a first wireless interface of the terminal device different from the specific wireless interface, the second communication scheme is different from the first communication scheme, the wireless connection according to the second communication scheme is established via a second wireless interface of the terminal device different from the specific wireless interface, and a communication speed of a wireless communication via the first and second wireless interfaces is faster than a communication speed of a wireless communication via the specific wireless interface; and supply a predetermined instruction to an OS (abbreviation of Operating System) program of the terminal device in a case where it is determined that the first wireless connection is the wireless connection according to the first communication scheme, wherein the predetermined instruction is not supplied to the OS program in a case where it is determined that the first wireless connection is the wireless connection according to the second communication scheme. The predetermined instruction may include: an instruction for disconnecting the first wireless connection; and an instruction for establishing a second wireless connection according to the second communication scheme via the second wireless interface between the terminal device and the communication device. The first wireless interface may be configured to be capable of establishing a wireless connection according to the first communication scheme under a state where the second wireless connection according to the second communication scheme is being established.

The aforementioned terminal device itself and a method performed by the terminal device are also novel and useful. Further, a communication system which comprises the aforementioned terminal device and communication device is also novel and useful.

A communication device disclosed in the present disclosure may comprise: a Wi-Fi interface configured to execute a wireless communication according to a Wi-Fi scheme; a specific wireless interface configured to execute a wireless communication according to a communication scheme different from the Wi-Fi scheme, a communication speed of a wireless communication via the Wi-Fi interface is faster than a communication speed of a wireless communication via the specific wireless interface, a display unit; a processor; and a memory storing computer-readable instructions therein, the computer-readable instructions, when executed by the processor, may cause the communication device to: display, on the display unit, an inquiry screen for inquiring of an user whether a Wi-Fi connection via the Wi-Fi interface is to be established between the communication device and a terminal device, in a case where a first connection request is received from the terminal device via the Wi-Fi interface, without a wireless connection via the specific wireless interface being established between the communication device and the terminal device, under a state where a target wireless network in which the communication device operates as a parent station that is a G/O (abbreviation of Group Owner) of a WFD (abbreviation of Wi-Fi Direct (registered trademark)) scheme is being formed and the terminal device is not participating, as a child station, in the target wireless network; in a case where it is selected by the user on the inquiry screen that the Wi-Fi connection is to be established, establish a first Wi-Fi connection via the Wi-Fi interface between the communication device and the terminal device so as to cause the terminal device to participate in the target wireless network as a client of the WFD scheme, wherein in a case where it is not selected by the user on the inquiry screen that the Wi-Fi connection is to be established, the first Wi-Fi connection is not established; and establish a second Wi-Fi connection via the Wi-Fi interface between the communication device and the terminal device without displaying the inquiry screen so as to cause the terminal device to participate in the target wireless network as a client of the WFD scheme, in a case where a second connection request is received from the terminal device via the Wi-Fi interface after the terminal device has seceded from the target wireless network due to an establishment of a specific wireless connection via the specific wireless interface between the communication device and the terminal device under a state where the target wireless network in which the communication device operates as the parent station that is the G/O is being formed and the terminal device is participating, as a legacy of the Wi-Fi scheme, in the target wireless network.

The aforementioned computer-readable instructions and computer-readable recording medium storing the computer-readable instructions are also novel and useful. A method performed by the communication device is also novel and useful. Further, a communication system which comprises the aforementioned communication device and terminal device is also novel and useful.

BRIEF DESCRIPTION OF THE DRAWINGS

FIG. 1 shows a configuration of a communication system.

EMBODIMENTS (Configuration of Communication System 2; FIG. 1)

As shown in FIG. 1, a communication system 2 comprises a mobile terminal 10 and a multi-function peripheral (called "MFP" below) 100. The mobile terminal 10 and the MFP 100 are capable of executing a Wi-Fi communication according to a Wi-Fi scheme, and an NFC communication according to an NFC (abbreviation of Near Field Communication) scheme.

(Configuration of Mobile Terminal 10)

Figure 2:
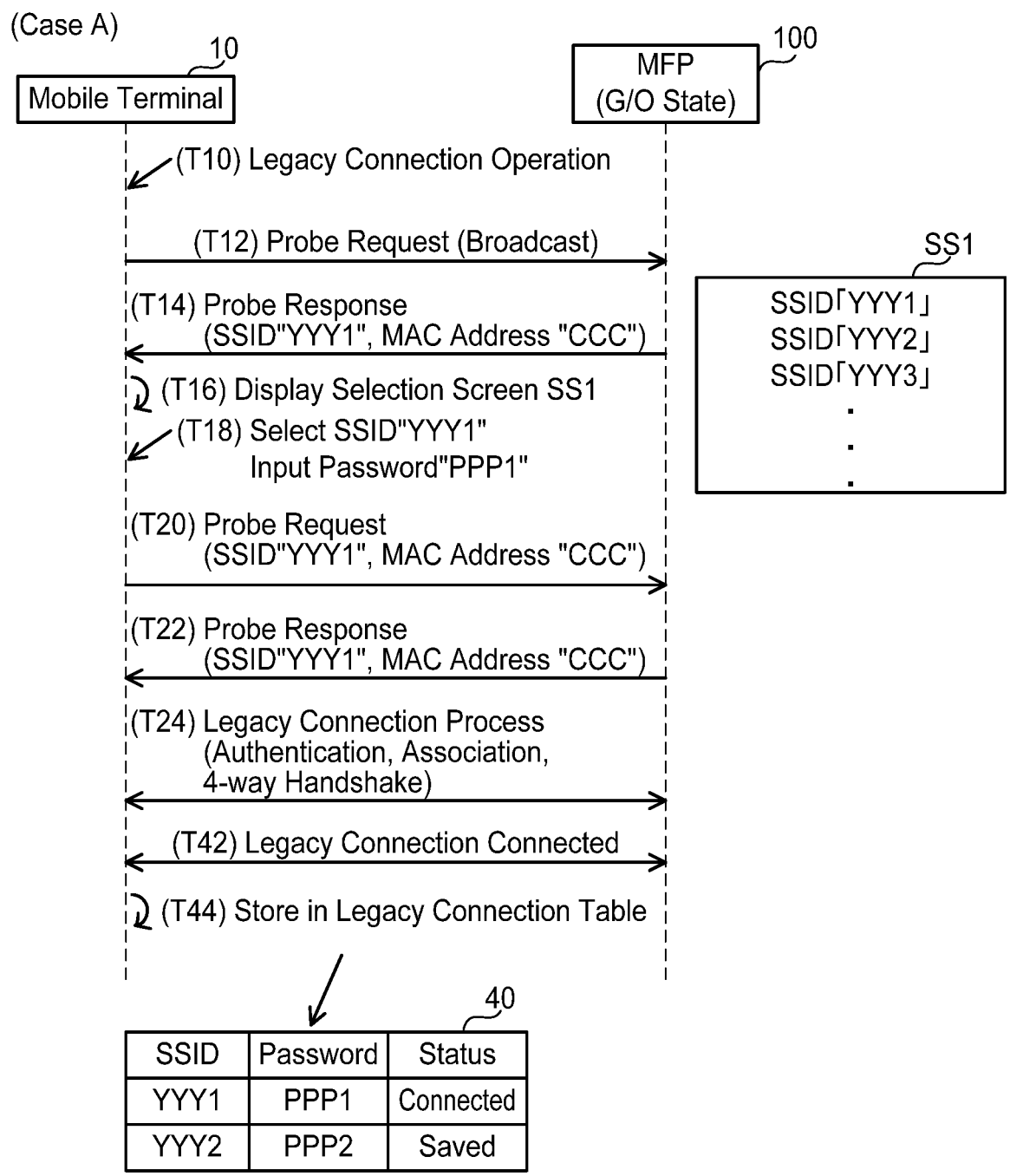
FIG. 2 shows a sequence diagram of a case A in which a legacy connection operation is executed.

The mobile terminal 10 is a portable terminal device such as a mobile telephone, a smartphone, a PDA, a notebook PC, a tablet PC, a portable music playback device or a portable movie playback device. A device name "TTT" is allocated to the mobile terminal 10. The mobile terminal 10 comprises an operation unit 12, a display unit 14, a legacy interface (below, interface is referred to as "I/F") 20, a WFD I/F 22, a mobile I/F 24, an NFC I/F 26, and a controller 30.

The operation unit 12 comprises a plurality of keys. A user can input various instructions to the mobile terminal 10 by operating the operation unit 12. The display unit 14 is a display for displaying various information, and also functions as a so-called touch panel (i.e., operation unit). Below, the operation unit 12 and the display unit 14 may collectively be termed "terminal operation unit".

The legacy I/F 20 is an I/F for executing a Wi-Fi communication according to the Wi-Fi scheme. However, the legacy I/F 20 does not support a WFD (abbreviation of Wi-Fi Direct (registered trademark)) scheme to be described later. The Wi-Fi scheme is a wireless communication scheme based on, for example, IEEE (abbreviation of The Institute of Electrical and Electronics Engineers, Inc.) standard 802.11 and standards conforming thereto (e.g., 802.11a, 11b, 11g, 11n, etc.). A MAC address "AAA" is allocated to the legacy I/F 20.

The mobile terminal 10 can establish a wireless connection, via the legacy I/F 20, with the MFP 100 that is operating as G/O (abbreviation of Group Owner) of the WFD (abbreviation of Wi-Fi Direct (registered trademark)) scheme, and participate, as a legacy, in a WFD network (called "WFDNW" below) formed by the MFP 100. Further, the mobile terminal 10 can also establish a wireless connection with an AP (abbreviation of Access Point) 200 via the legacy I/F 20, and participate, as a legacy, in a wireless network formed by the AP 200. Under a state where a wireless connection is established with the AP 200, the mobile terminal 10 can access the Internet 4 via the AP 200. Below, a wireless connection via the legacy I/F 20 is called "legacy connection".

The WFD I/F 22 is an I/F for executing a Wi-Fi communication according to the Wi-Fi scheme. The WFD I/F 22 supports the WFD scheme formulated by the Wi-Fi Alliance. The WFD scheme is a wireless communication scheme described in the standard document "Wi-Fi Peer-to-Peer (P2P) Technical Specification Version 1.5" created by the Wi-Fi Alliance. Further, the WFD I/F 22 supports a WPS (abbreviation of Wi-Fi Protected Setup) formulated by the Wi-Fi Alliance. The WPS is a so-called automatic wireless setting or easy wireless setting, and is a technology capable of easily establishing a wireless connection between a pair of devices without the user inputting wireless setting information (e.g., password, authentication scheme, encryption scheme, etc.) in order to establish the wireless connection. In particular, the WFD I/F 22 supports a PBC (abbreviation of Push Button Configuration) scheme of the WPS. The PBC scheme is a scheme for establishing a wireless connection between a pair of devices in a case where the user executes a wireless connection operation (e.g., a button-pushing operation) on each of the pair of devices. A MAC address "BBB" is allocated to the WFD I/F 22.

The mobile terminal 10 can establish, via the WFD I/F 22, a wireless connection with the MFP 100 that is operating as G/O according to the WFD scheme, and participate, as a client of the WFD scheme, in the WFDNW formed by the MFP 100. Below, a wireless connection via the WFD I/F 22 is called "WFD connection". Further, the legacy connection and the WFD connection may collectively be termed "Wi-Fi connection".

Under a state where a legacy connection is established via the legacy I/F 20, the mobile terminal 10 can further establish a WFD connection via the WFD I/F 22. Further, under a state where a WFD connection is established via the WFD I/F 22, the mobile terminal 10 can further establish a legacy connection via the legacy I/F 20. However, the mobile terminal 10 cannot simultaneously establish two or more legacy connections via the legacy I/F 20, and cannot simultaneously establish two or more WFD connections via the WFD I/F 22.

The mobile I/F 24 is an I/F for executing a wireless communication according to a cellular scheme (e.g., 3G scheme, 4G scheme, etc.) (called "mobile communication" below). The mobile terminal 10 can access the Internet 4 via the mobile I/F 24. Under the state where a WFD connection is established via the WFD I/F 22, the mobile terminal 10 can further access the Internet 4 via the mobile I/F 24. However, under the state where a legacy connection via the legacy I/F 20 is established, the mobile terminal 10, because of its specifications, cannot further access the Internet 4 via the mobile I/F 24.

The NFC I/F 26 is an I/F for executing an NFC communication according to the NFC (abbreviation of Near Field Communication) scheme. The NFC scheme is a wireless communication scheme based on international standards, such as ISO/IEC14443, 15693, 18092. An I/F called an NFC forum device and an I/F called an NFC forum tag are known as types of I/F for executing an NFC communication. The NFC I/F 26 is an NFC forum device, and is an I/F capable of selectively operating in any of a P2P (abbreviation of Peer To Peer) mode, an R/W (abbreviation of Reader/Writer) mode, and a CE (abbreviation of Card Emulation) mode.

Next, differences between the legacy I/F 20, the WFD I/F 22, and the NFC I/F 26 will be described. The WFD I/F 22 differs from the legacy I/F 20 in supporting the WFD scheme, but is the same as the legacy I/F 20 in terms of communication speed, frequency, and communication distance. Below, differences between the WFD I/F 22 (and the legacy I/F 20) and the NFC I/F 26 regarding the above terms will be described. A communication speed of a Wi-Fi communication via the WFD I/F 22 (e.g., maximum communication speed is 11 to 600 Mbps) is faster than a communication speed of an NFC communication via the NFC I/F 26 (e.g., maximum communication speed is 100 to 424 Kbps). Further, a frequency of a carrier wave in a Wi-Fi communication via the WFD I/F 22 (e.g., 2.4 GHz band or 5.0 GHz band) is different from a frequency of a carrier wave in an NFC communication via the NFC I/F 26 (e.g., 13.56 MHz band). Further, a maximum distance with which a Wi-Fi communication via the WFD I/F 22 can be executed (e.g., about 100 m at maximum) is greater than a maximum distance with which an NFC communication via the NFC I/F 26 can be executed (e.g., about 10 cm at maximum).

The mobile I/F 24 is different from the other I/Fs 20, 22, 26 in terms of communication scheme. Further, in terms of communication speed, frequency, and communication distance, the mobile I/F 24 is different from the NFC I/F 26, similarly to the legacy I/F 20 and the WFD I/F 22. That is, the mobile I/F 24 has a communication speed faster than the NFC I/F 26, uses a frequency different from the NFC I/F 26, and has a communication distance greater than the NFC I/F 26.

The controller 30 comprises a CPU 32 and a memory 34. The CPU 32 executes various processes in accordance with programs 36, 38 stored in the memory 34. The OS (abbreviation of Operating System) program 36 is a program for controlling various basic operations of the mobile terminal 10.

The MFP application 38 is an application provided by a vendor of the MFP 100 or the like, and is installed in the mobile terminal 10 from, for example, a server on the Internet 4. The MFP application 38 is an application for, in response to establishment of an NFC link between the mobile terminal 10 and the MFP 100, establishing a WFD connection between the mobile terminal 10 and the MFP 100, and executing a communication of target data (e.g., print data, scan data, etc.) between the mobile terminal 10 and the MFP 100. Below, the MFP application 38 is simply called "application 38".

A legacy connection table 40 is stored in the memory 34. Legacy information, in which an SSID (abbreviation of Service Set Identifier), a password, and a status are associated with one another, is stored in the legacy connection table 40. The legacy information is registered in the legacy connection table 40 when a legacy connection is established between the mobile terminal 10 and an external device (e.g., the AP 200). The status indicates any of "Connected" which indicates that a legacy connection is being established, "Saved" which indicates that a legacy connection is not currently established and establishment of a legacy connection is waited, and "Not Connected" which indicates that a legacy connection is not currently established and establishment of a legacy connection is not waited. The aforementioned "establishment of a legacy connection is waited (or not waited)" means that a legacy connection is automatically established (or not established) in a case where a connection target device exists in a vicinity. The status "Saved" and "Not Connected" may be changed by the user.

(Configuration of MFP 100)

The MFP 100 is a peripheral device capable of executing multiple functions including a print function and a scan function. A device name "MMM" is allocated to the MFP 100. The MFP 100 comprises an operation unit 112, a display unit 114, a print executing unit 116, a scan executing unit 118, a Wi-Fi I/F 120, an NFC I/F 122, and a controller 130.

The operation unit 112 comprises a plurality of keys. The user can input various instructions to the MFP 100 by operating the operation unit 112. The display unit 114 is a display capable of displaying various information using a character string and an icon image, and also functions as a so-called touch panel (i.e., operation unit). The print executing unit 116 is a printing mechanism of an ink jet scheme, laser scheme, etc. The scan executing unit 118 is a scanning mechanism of a CCD, CIS, etc.

The Wi-Fi I/F 120 is an I/F for executing a Wi-Fi communication according to the Wi-Fi scheme, and supports the WFD scheme. That is, the Wi-Fi I/F 120 is the same as the WFD I/F 22 of the mobile terminal 10. Further, the NFC I/F 122 is the same as the NFC I/F 26 of the mobile terminal 10.

The MFP 100 can form a WFDNW by operating as the G/O of the WFD scheme. In this case, the MFP 100 can establish a legacy connection with the mobile terminal 10 via the Wi-Fi I/F 120, and cause the mobile terminal 10 to participate in the WFDNW as a legacy. Further, the MFP 100 can establish a WFD connection with the mobile terminal 10 via the Wi-Fi I/F 120, and cause the mobile terminal 10 to participate in the WFDNW as a client of the WFD scheme.

The Controller 130 Comprises a CPU 132 and a Memory 134. The CPU 132 Executes various processes in accordance with a program 136 stored in the memory 134. The memory 134 is constituted of a volatile memory, a non-volatile memory, etc.

(Establishment of Wi-Fi Connection between Mobile Terminal 10 and MFP 100)

Next, with reference to FIG. 2 to FIG. 4, cases will be described, in which a Wi-Fi connection (i.e., legacy connection or WFD connection) is established between the mobile terminal 10 and the MFP 100. In an initial state of each case, the MFP 100 operates as the G/O of the WFD scheme and forms a WFDNW. Wireless setting information to be used in the WFDNW includes an SSID "YYY1" and a password "PPP1". The device name of the MFP 100 is included in the SSID.

(Case A; FIG. 2)

In a case A, a legacy connection is established between the mobile terminal 10 and the MFP 100, in a case where a legacy connection operation is executed by the user in the terminal operation unit. In the case A, the mobile terminal 10 establishes the legacy connection by using the OS program 36 without using the application 38.

Upon the legacy connection operation being executed in the terminal operation unit by the user in T10, in T12, the mobile terminal 10 sends a Probe request by broadcast via the legacy I/F 20. The Probe request is a signal for searching for a device capable of establishing a legacy connection with the mobile terminal 10.

Upon receiving the Probe request from the mobile terminal 10 via the Wi-Fi I/F 120 in T12, in T14, the MFP 100 sends a Probe response including the SSID "YYY1" and a MAC address "CCC" of the Wi-Fi I/F 120 to the mobile terminal 10 via the Wi-Fi I/F 120.

Upon receiving the Probe response from the MFP 100 via the legacy I/F 20 in T14, in T16, the mobile terminal 10 displays, on the display unit 14, a selection screen SS1 including the SSID "YYY1" included in the Probe response. Since the mobile terminal 10 receives a Probe response also from a parent station different from the MFP 100 (e.g., the AP 200), the selection screen SS1 includes not only the SSID "YYY1" of the MFP 100, but also an SSID "YYY2" of the different parent station, and the like. In T18, the mobile terminal 10 accepts a selection of the SSID "YYY1", and further accepts an input of the password "PPP1" on the selection screen SS1. In this case, in T20, the mobile terminal 10 sends a Probe request including the selected SSID "YYY1" and the MAC address "CCC" by unicast to the MFP 100 via the legacy I/F 20. This Probe request is a signal for requesting the MFP 100 to establish a legacy connection.

Upon receiving the Probe request from the mobile terminal 10 via the Wi-Fi I/F 120 in T20, in T22, the MFP 100 sends a Probe response including the SSID "YYY1" and the MAC address "CCC" to the mobile terminal 10 via the Wi-Fi I/F 120.

Upon receiving the Probe response from the MFP 100 via the legacy I/F 20 in T22, in T24, the mobile terminal 10 executes a legacy connection process (i.e., communications of Authentication, Association, 4-way Handshake, etc.) via the legacy I/F 20 by using the SSID "YYY1" and the password "PPP1" which were inputted in T18. Specifically, the mobile terminal 10 sends the SSID "YYY1" and the password "PPP1" to the MFP 100, and authentication of these pieces of information succeeds in the MFP 100. As a result, in T42, the mobile terminal 10 establishes a legacy connection with the MFP 100 and participates, as a legacy, in the WFDNW in which the MFP 100 operates as the G/O. From the viewpoint of the MFP 100, the MFP 100 establishes the legacy connection with the mobile terminal 10 and causes the mobile terminal 10 to participate, as a legacy, in the WFDNW in which the MFP 100 operates as the G/O.

In a case where the legacy connection with the MFP 100 is established for the first time, in T44, the mobile terminal 10 registers, in the legacy connection table 40, legacy information including the SSID "YYY1", the password "PPP1", and the status "Connected".

(Case B; FIG. 3)

In a case B, a WFD connection is established between the mobile terminal 10 and the MFP 100 in a case where a WFD connection operation, which is different from the legacy connection operation, is executed in the terminal operation unit by the user. In the case B, the mobile terminal 10 establishes the WFD connection by using the OS program 36 without using the application 38.

Upon the WFD connection operation being executed in the terminal operation unit by the user in T110, in T112, the mobile terminal 10 sends a Probe request by broadcast via the WFD I/F 22. This Probe request is a signal for searching for a device capable of establishing a WFD connection with the mobile terminal 10. T114 is the same as T14 of FIG. 2 except for the mobile terminal 10 receiving a Probe response via the WFD I/F 22. T116 is the same as T16.

In T118, the mobile terminal 10 accepts a selection of the SSID "YYY1" on the selection screen SS1. Here, T118 is different from T18 of FIG. 2 in not accepting an input of the password "PPP1". In T120, the mobile terminal 10 sends a Probe request including the SSID "YYY1", the MAC address "CCC", and the device name "TTT" by unicast to the MFP 100 via the WFD I/F 22. This Probe request is a signal for requesting the MFP 100 to establish a WFD connection.

Upon receiving the Probe request from the mobile terminal 10 via the Wi-Fi I/F 120 in T120, in T122, the MFP 100 sends a Probe response including the SSID "YYY1" and the MAC address "CCC" to the mobile terminal 10 via the Wi-Fi I/F 120.

Upon receiving the Probe response via the WFD I/F 22 in T122, in T124, the mobile terminal 10 sends a Service Discovery request to the MFP 100 via the WFD I/F 22, and in T126, receives a response thereto from the MFP 100 via the WFD I/F 22. Next, in T128, the mobile terminal 10 sends a Provision Discovery request to the MFP 100 via the WFD I/F 22.

Upon receiving the Provision Discovery request from the MFP 100 via the Wi-Fi I/F 120 in T128, in T130, the MFP 100 displays a connection confirmation screen SS2 on the display unit 114. The connection confirmation screen SS2 is a screen for causing the user to select whether or not a WFD connection is to be established with the mobile terminal 10 having the device name "TTT" included in the Probe request. Upon accepting a selection of a "YES" button on the connection confirmation screen SS2 in T132, in T134, the MFP 100 sends a Provision Discovery response to the mobile terminal 10 via the Wi-Fi I/F 120. Since the MFP 100 enables an operation according to the PBC scheme of the WPS in response to accepting the selection of the "YES" button, the MFP 100 can execute WSC Exchange to be described later. It should be noted that the timing at which the MFP 100 displays the connection confirmation screen SS2 may be immediately after the MFP 100 has received the Probe request in T120, or the like.

Upon receiving the Provision Discovery response from the MFP 100 via the WFD I/F 22 in T134, in T140, the mobile terminal 10 executes a specific connection process (communications of WSC Exchange, Authentication, Association, 4-way Handshake, etc.) via the WFD I/F 22. Specifically, the mobile terminal 10 receives the SSID "YYY1" and the password "PPP1" from the MFP 100 in the WSC Exchange which is a communication according to the PBC scheme of the WPS. Then, the mobile terminal 10 sends the SSID "YYY1" and the password "PPP1" to the MFP 100, and authentication of these pieces of information succeeds in the MFP 100. As a result, in T142, the mobile terminal 10 establishes a WFD connection with the MFP 100 and participates, as a client, in the WFDNW in which the MFP 100 operates as the G/O. From the viewpoint of the MFP 100, the MFP 100 establishes the WFD connection with the mobile terminal 10 and causes the mobile terminal 10 to participate, as a client, in the WFDNW in which the MFP 100 operates as the G/O.

In the case where the WFD connection with the MFP 100 is established, the mobile terminal 10 does not execute the same process as T44 of FIG. 2. That is, the mobile terminal 10 does not register the SSID "YYY1", the "password PPP1", and the like in the legacy connection table 40.

(Case C1; FIG. 4)

In a case C1, the mobile terminal 10 establishes a WFD connection with the MFP 100 by using the application 38. In an initial state of the case C1, a WFD connection with the MFP 100 is not established by using the application 38.

Figure 10:
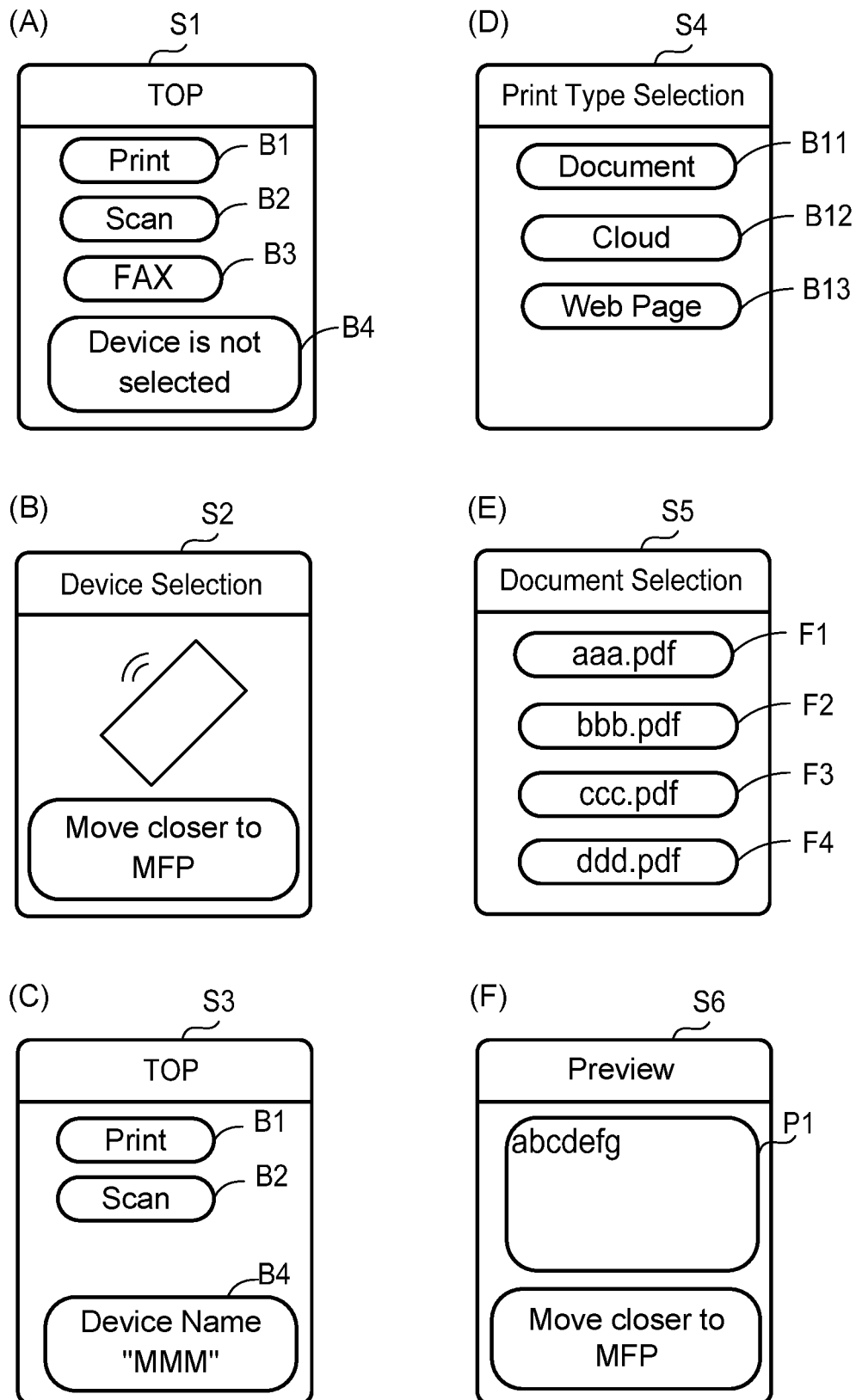
FIG. 10 shows screens displayed by the MFP application.

Upon an operation for activating the application 38 being executed in the terminal operation unit by the user in T210, in T212, the mobile terminal 10 displays a TOP screen S1 (see FIG. 10(A)) on the display unit 14. The TOP screen S1 includes a print button B1, a scan button B2, a fax button B3, and a device selection button B4. The device selection button B4 on the TOP screen S1 includes a message indicating that a device for executing the functions of printing, scanning, and the like is not selected. In this state, each of the buttons B1 to B3 is disabled, and the mobile terminal 10 does not accept operations of the buttons B1 to B3. It should be noted that, as a variant, a dialog which prompts a device selection may be displayed on the display unit 14 in a case where any of the operations of the buttons B1 to B3 is accepted. When the device selection button B4 is operated by the user in T214, in T216, the mobile terminal 10 displays, on the display unit 14, an instruction screen S2 (see FIG. 10(B)) for instructing the user to move the mobile terminal 10 closer to the MFP 100, for example.

Upon the user moving the mobile terminal 10 closer to the MFP 100 in T218, in T220, an NFC link is established between the NFC I/F 26 of the mobile terminal 10 and the NFC I/F 122 of the MFP 100. In this case, in T222, the MFP 100 sends the MAC address "CCC", the SSID "YYY1", and an IP address 100a to the mobile terminal 10 by using the NFC link. The IP address 100a is an IP address of the MFP 100 in the WFDNW in which the MFP 100 operates as the G/O.

Upon receiving the MAC address "CCC", the SSID "YYY1", and the IP address 100a from the MFP 100 in T222 by using the NFC link, in T230, the mobile terminal 10 sends, to the MFP 100, a PING signal including the received IP address 100a as its destination. Here, the mobile terminal 10 executes both of sending of the PING signal via the legacy I/F 20 and sending of the PING signal via the WFD I/F 22. The PING signal is a signal for checking whether a legacy connection or a WFD connection is established between the mobile terminal 10 and the MFP 100. Since neither of a legacy connection nor a WFD connection is established at the time of T230, the mobile terminal 10 does not receive a PING response to the PING signal.

Figure 3:
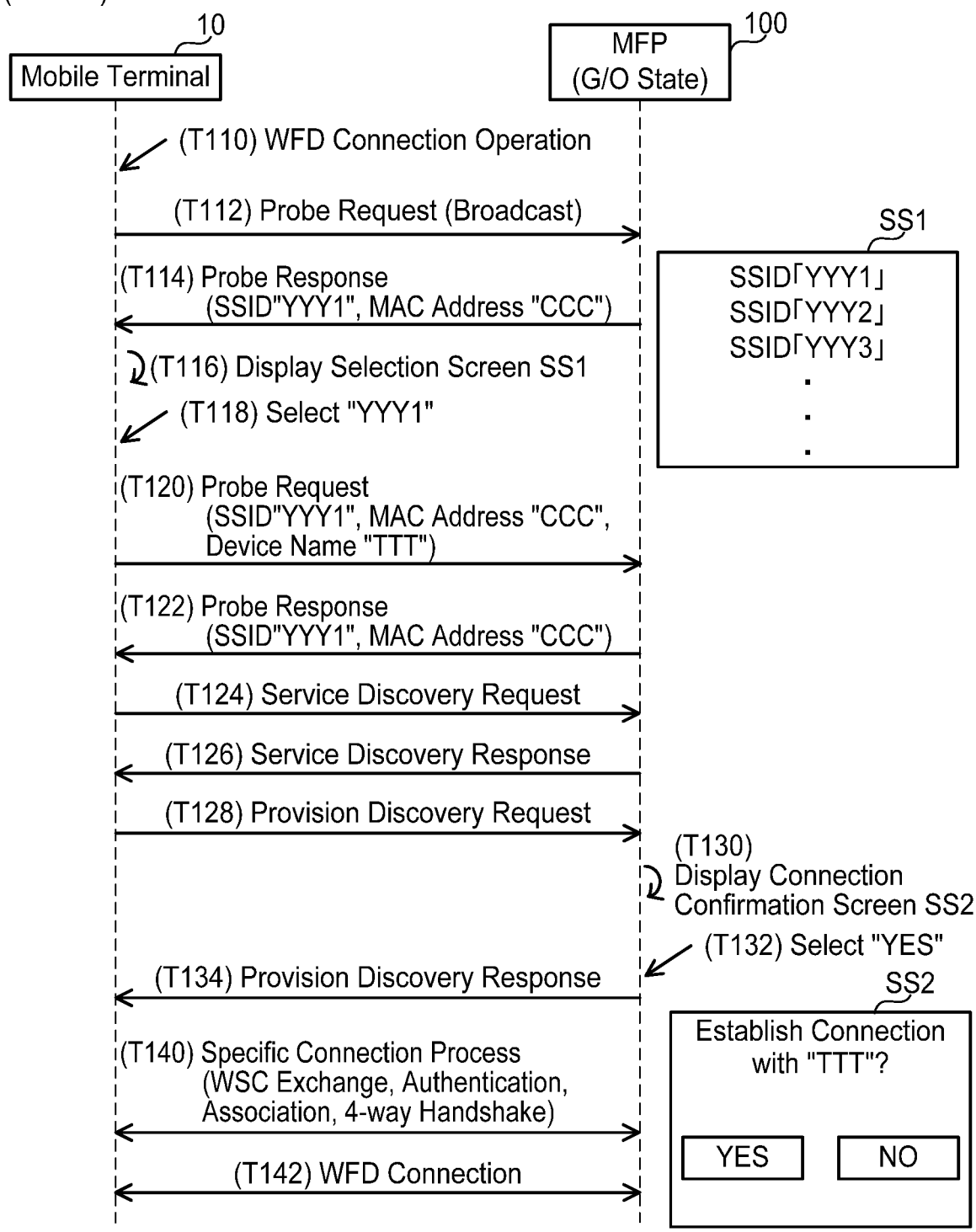
FIG. 3 shows a sequence diagram of a case B in which a WFD connection operation is executed.

T240, T242 are the same as T112, T114 of FIG. 3, respectively. Upon receiving a Probe response from each of one or more parent stations including the MFP 100 via the WFD I/F 22 in T242, the mobile terminal 10 confirms existence of a Probe response including the SSID "YYY1" which was received in T222 among the one or more Probe responses. Then, in T244, the mobile terminal 10 sends a Probe request including the MAC address "CCC" included in that Probe response to the MFP 100 by unicast via the WFD I/F 22, and in T246, receives a Probe response from the MFP 100 via the WFD I/F 22.

Upon receiving the Probe response from the MFP 100 via the WFD I/F 22 in T246, in T250, the mobile terminal 10 executes a WFD connection process (communications of Service Discovery, Provision Discovery, WSC Exchange, Authentication, Association, 4-way Handshake, etc.) via the WFD I/F 22. It should be noted that, in the WFD connection process of T250, the MFP 100 does not display the connection confirmation screen SS2 even when receiving a Provision Discovery request from the mobile terminal 10 via the Wi-Fi I/F 120. This point is different from T124 to T140 of FIG. 3. This is because the MFP 100 does not need to display the connection confirmation screen SS2 since the operation according to the PBC scheme of the WPS is enabled in response to the NFC link being established in T220 connection. T252 is the same as T142 of FIG. 3.

In T260, the mobile terminal 10 sends a function information request to the MFP 100 via the WFD I/F 22 by using the WFD connection. The function information request is a signal for confirming functions which can be executed by the MFP 100. In T262, the mobile terminal 10 receives function information from the MFP 100 via the WFD I/F 22. The function information includes information indicating that the MFP 100 is capable of executing the print function and the scan function, and the device name "MMM" of the MFP 100. Then, in T270, the mobile terminal 10 displays, on the display unit 14, a TOP screen S3 (see FIG. 10(C)) corresponding to the received function information. The TOP screen S3 includes the print button B1 corresponding to the print function which can be executed by the MFP 100, and the scan button B2 corresponding to the scan function which can be executed by the MFP 100. The TOP screen S3 does not include the fax button B3 corresponding to a fax function which cannot be executed by the MFP 100. Further, the device selection button B4 includes the device name "MMM" of the MFP 100. Thereby, the user can know that the WFD connection has been established between the mobile terminal 10 and the MFP 100 having the device name "MMM".

Figure 5:
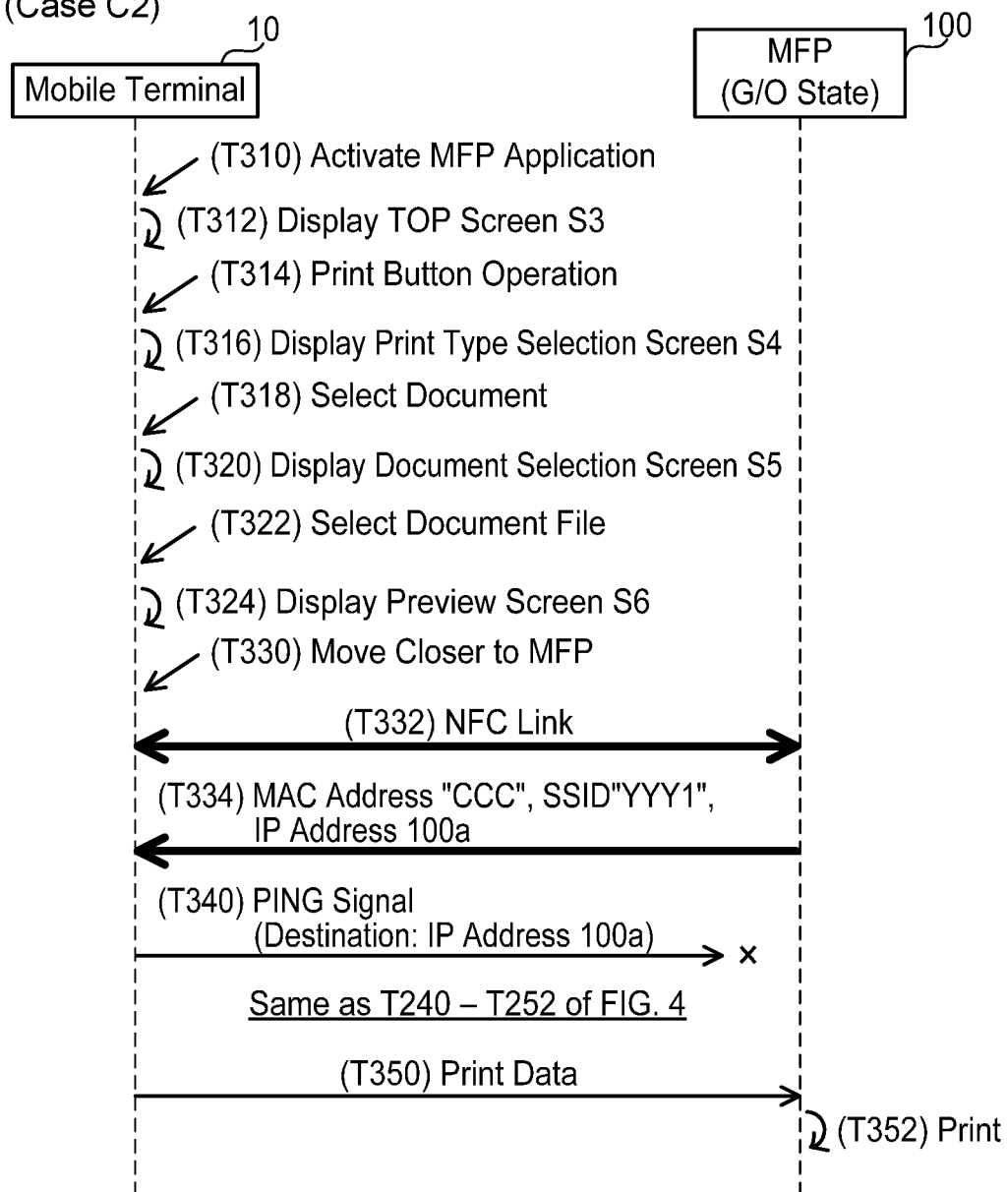
FIG. 5 shows a sequence diagram of a case C2 in which printing is executed using an NFC communication under a state where a wireless connection is not established between the mobile terminal and the MFP.

(Case C2; FIG. 5)

A case C2 is a continuation of the case C1. That is, the mobile terminal 10 has acquired the function information of the MFP 100 (see T262 of FIG. 4). Further, in an initial state of the case C2, due to the user executing an operation for disconnecting the WFD connection established in T252 of FIG. 4, the WFD connection is disconnected.

Upon an operation for activating the application 38 being executed by the user in T310, in T312, the mobile terminal 10 displays the TOP screen S3 (see FIG. 10(C)) on the display unit 14. Although a WFD connection is not currently established between the mobile terminal 10 and the MFP 100, the device selection button B4 includes the device name "MMM" of the MFP 100.

Upon the print button B1 being operated by the user in T314, in T316, the mobile terminal 10 displays a print type selection screen S4 (see FIG. 10(D)) on the display unit 14. The print type selection screen S4 includes a document button B11, a cloud button B12, and a web page button B13. The document button B11 is a button for printing an image represented by a data file stored in the memory 34 of the mobile terminal 10. The cloud button B12 is a button for receiving a data file from a cloud server 400 (see FIG. 1) on the Internet 4, and printing an image represented by that data file. Further, the web page button B13 is a button for receiving web page data from a web server 300 (see FIG. 1) on the Internet 4, and printing an image represented by the web page data.

Upon the document button B11 being selected by the user in T318, in T320, the mobile terminal 10 displays a document selection screen S5 (see FIG. 10(E)) on the display unit 14. The document selection screen S5 includes file names F1 to F4 of document files stored in the memory 34. Upon the file name F1 being selected by the user in T322, in T324, the mobile terminal 10 displays a preview screen S6 (see FIG. 10(F)) on the display unit 14. The preview screen S6 includes a print preview image P1 of the document file having the file name F1, and a message instructing the mobile terminal 10 to be moved closer to the MFP 100. It should be noted that the state where the preview screen S6 is being displayed on the display unit 14, in other words, the state where the print preview image P1 is being displayed on the display unit 14, is a state where the mobile terminal 10 has completed generating print data to be sent to the MFP 100, or a state where the mobile terminal 10 is capable of executing the generation of print data to be sent to the MFP 100 without accessing the Internet 4. Several situations in which the preview screen is displayed on the display unit 14 of the mobile terminal 10 will be described. For example, in a case of printing an image represented by a file of a specific format for which the mobile terminal 10 cannot generate print data, the mobile terminal 10 sends target data to a data conversion server 500 (see FIG. 1) on the Internet 4 via the AP 200. Then, the mobile terminal 10 receives, via the AP 200, converted data which was converted by the data conversion server 500, and displays an image represented by the converted data on the display unit 14 as a preview image. Further, for example, the mobile terminal 10 receives a data file from the cloud server 400 via the AP 200, and displays an image represented by the data file on the display unit 14 as a preview image. Further, for example, the mobile terminal 10 receives web page data from the web server 300 via the AP 200, and displays an image represented by the web page data on the display unit 14 as a preview image. Accordingly, in any of the aforementioned cases, under the state where a preview screen (i.e., the print preview image) is being displayed on the display unit 14, the mobile terminal 10 is in the state of having completed generation of print data to be sent to the MFP 100, or the mobile terminal 10 is in the state of being capable of generating print data to be sent to the MFP 100 without accessing the Internet 4.

In T330, the user moves the mobile terminal 10 closer to the MFP 100 in response to the message on the preview screen S6. T332 to T340, which are executed thereafter, are the same as T220 to T230 of FIG. 4. Further, the same processes as T240 to T252 of FIG. 4 are executed. Thereby, a WFD connection is established between the mobile terminal 10 and the MFP 100. Then, in T350, the mobile terminal 10 sends print data representing the document file selected in T322 to the MFP 100 via the WFD I/F 22 by using the WFD connection.

Upon receiving the print data from the mobile terminal 10 via the Wi-Fi I/F 120 by using the WFD connection in T350, in T352, the MFP 100 supplies the print data to the print executing unit 116, and executes printing of the image represented by the print data.

Figure 6:
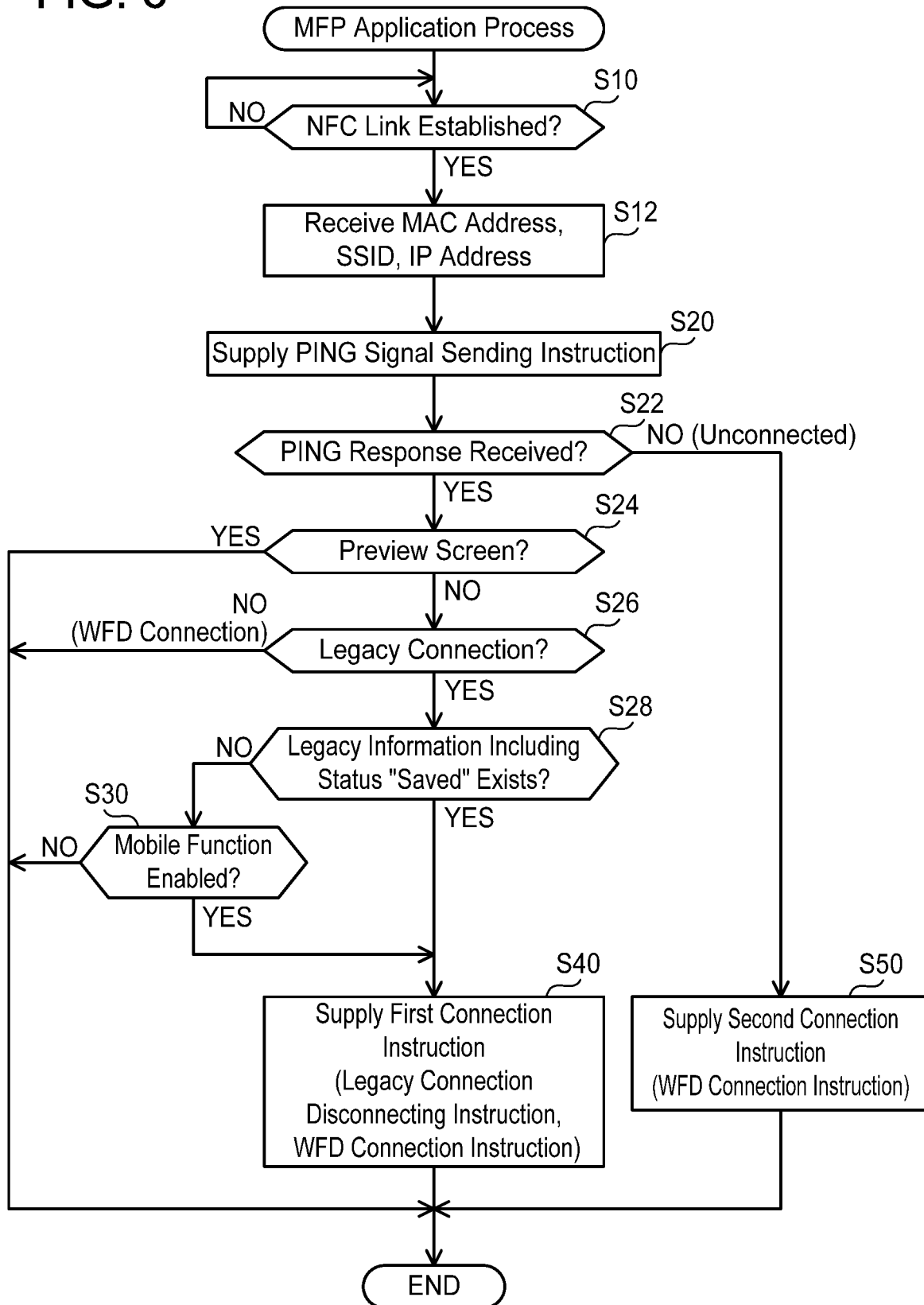
FIG. 6 shows a flowchart of a process executed by an MFP application of the mobile terminal.

(MFP Application Process Executed by Mobile Terminal 10; FIG. 6)

Next, with reference to FIG. 6, contents of a process executed by the CPU 32 of the mobile terminal 10 according to the application 38 will be described. In the case where the operation for activating the application 38 is executed in the terminal operation unit, the process of FIG. 6 is started. At the time when the process of FIG. 6 is started, any one of the following states is assumed: the state where a legacy connection is established between the mobile terminal 10 and the MFP 100 (e.g., a state after the case A of FIG. 2), the state where a WFD connection is established (e.g., a state after the case B, the case C1, or the case C2 of FIG. 3 to FIG. 5), and a state where neither a legacy connection nor a WFD connection is established.

Not all processes executed by the application 38 are shown in FIG. 6. For example, the application 38 executes processes for displaying the screens of FIG. 10 (e.g., T212 of FIG. 4, etc.) and the like, however, these processes are not shown. It should be noted that, below, for convenience of explanation, the subject of processes executed by the CPU 32 according to the application 38, and the subject of processes executed by the CPU 32 according to the OS program 36 are referred to simply as "application 38" and "OS 36" respectively, without referring to the CPU 32 as the subject.

In S10, the application 38 monitors whether an NFC link is established between the mobile terminal 10 and the MFP 100. In a case of acquiring establishment information indicating that an NFC link has been established from the NFC I/F 26, the application 38 determines YES in S10 (T220 of FIG. 4, T332 of FIG. 5), and proceeds to S12.

Figure 4:
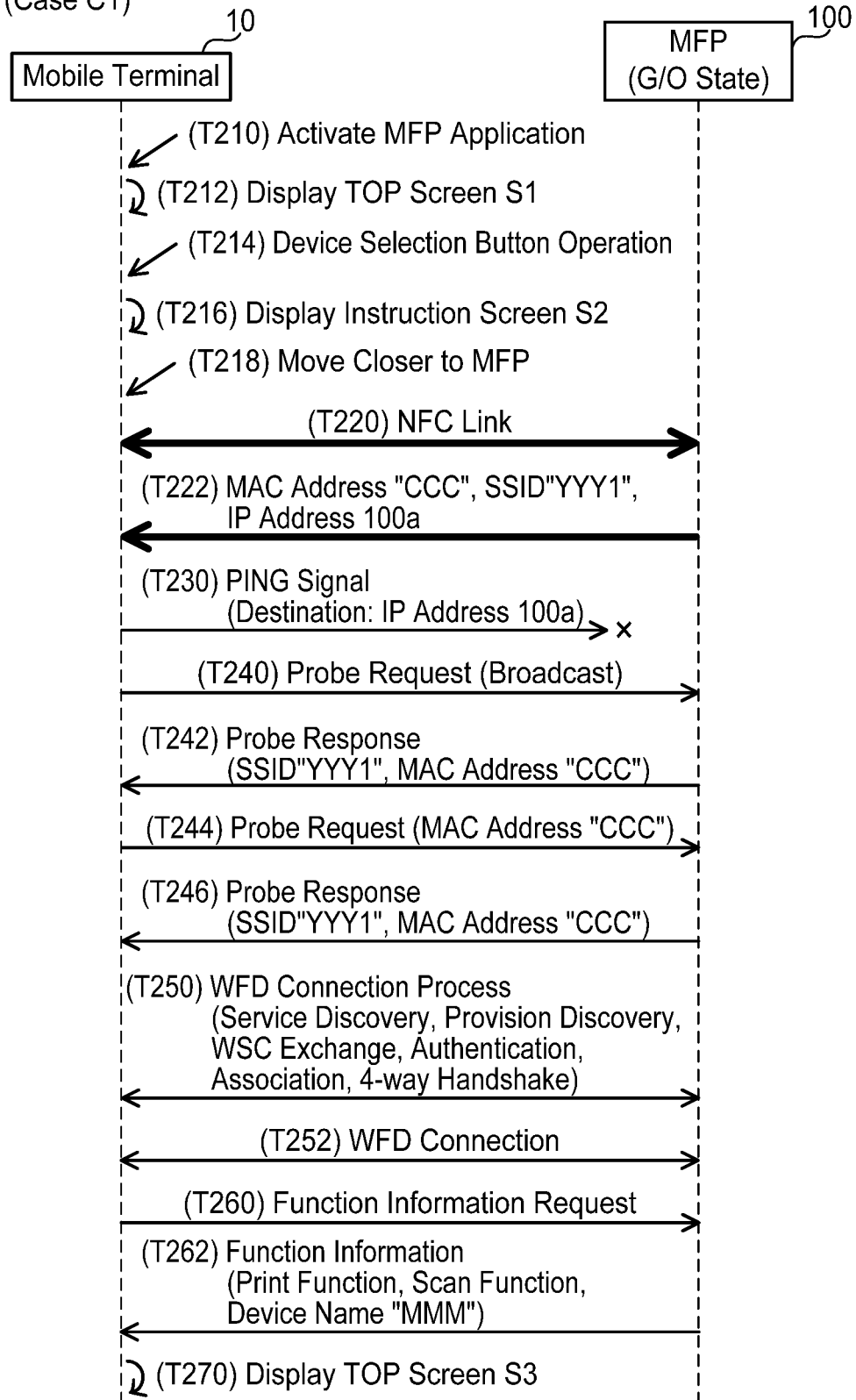
FIG. 4 shows a sequence diagram of a case C1 in which an NFC communication is executed under a state where a wireless connection is not established between a mobile terminal and an MFP.

In S12, the application 38 receives the MAC address "CCC", the SSID "YYY1", and the IP address 100a from the MFP 100 via the NFC I/F 26 (T222 of FIG. 4, T334 of FIG. 5).

In S20, the application 38 supplies a PING signal sending instruction to the OS 36. The PING signal sending instruction is an instruction for requesting sending of a PING signal that includes the IP address 100a received in S12 as the destination. Upon acquiring the PING signal sending instruction, the OS 36 supplies the PING signal sending instruction to each of the legacy I/F 20 and the WFD I/F 22. As a result, the legacy I/F 20 sends a PING signal, and the WFD I/F 22 sends a PING signal. The OS 36 receives a PING response from the MFP 100 via the legacy I/F 20 in a case where a legacy connection is established between the mobile terminal 10 and the MFP 100, or receives a PING response from the MFP 100 via the WFD I/F 22 in a case where a WFD connection is established between the mobile terminal 10 and the MFP 100. In a case where the PING response is received via either the I/F 20 or the I/F 22, the OS 36 supplies PING response information, which indicates that the PING response has been received, to the application 38, and in a case where the PING response is not received, the OS 36 does not supply the PING response information to the application 38. The PING response information does not include information indicating via which of the I/F 20 or the I/F 22 the PING response was received. Consequently, even when acquiring the PING response information from the OS 36, the application 38 cannot identify which of a legacy connection and a WFD connection is established.

It should be noted, in a variant, the PING response information may include the information indicating via which of the I/F 20 or the I/F 22 the PING response was received. In this case, based on this information, the application 38 can determine, in S26 to be described later, whether a legacy connection is established with the MFP 100 or a WFD connection is established with the MFP 100.

In S22, the application 38 determines whether a PING response has been received. In a case of acquiring the PING response information from the OS 36, the application 38 determines YES in S22 and proceeds to S24, or in a case of not acquiring the PING response information from the OS 36, the application 38 determines NO in S22 (T230 of FIG. 4, T340 of FIG. 5), and proceeds to S50.

In S50, the application 38 supplies a second connection instruction including a WFD connection instruction to the OS 36. The WFD connection instruction is an instruction for requesting establishment of a WFD connection. Upon acquiring the second connection instruction, the OS 36 executes the processes of T242 to T252 of FIG. 4. Thereby, a WFD connection is established between the mobile terminal 10 and the MFP 100, and the mobile terminal 10 participates, as a client, in the WFDNW in which the MFP 100 operates as the G/O. When S50 ends, the process of FIG. 6 ends.

On the other hand, in a case where a legacy connection or a WFD connection is established between the mobile terminal 10 and the MFP 100, the determination of YES is made in S22, and S24 is executed. In S24, the application 38 determines whether the preview screen S6 (see FIG. 10(F)) is being displayed on the display unit 14. In a case of determining that a screen other than the preview screen S6 (e.g., the instruction screen S2 (see FIG. 10(B)), etc.) is being displayed (NO in S24), the application 38 proceeds to S26. On the other hand, in a case of determining that the preview screen S6 is being displayed (YES in S24), the application 38 ends the process of FIG. 6. In the state where the preview screen S6 is being displayed, there is a high possibility that the user of the mobile terminal 10 wishes to cause the MFP 100 to execute printing of the image represented by the preview screen S6. In such circumstances, it is not necessary to execute the processes from S26 onward, and thus the legacy connection with the MFP 100 is not disconnected in S40 to be described later, as a result of which the mobile terminal 10 can appropriately send the print data to the MFP 100 by using the legacy connection.

In S26, the application 38 determines whether a legacy connection is established or a WFD connection is established between the mobile terminal 10 and the MFP 100. The application 38 firstly determines whether legacy information including the status "Connected" exists by referring to the legacy connection table 40. In a case where the legacy information does not exist, the application 38 determines that a WFD connection is established (NO in S26), and ends the process of FIG. 6. On the other hand, in a case where the legacy information exists, the application 38 determines whether the SSID included in the legacy information is identical to the SSID received in S12. In a case where the former SSID and the latter SSID are identical, the application 38 determines that a legacy connection is established (YES in S26), and proceeds to S28, or in a case where the former SSID and the latter SSID are not identical, the application 38 determines that a WFD connection is established (NO in S26), and ends the process of FIG. 6. As described above, by referring to the legacy connection table 40, the application 38 can appropriately determine which of a legacy connection and a WFD connection is established.

In S28, the application 38 determines, by referring to the legacy connection table 40, whether legacy information including the status "Saved" exists. The application 38 proceeds to S40 in a case of determining that the legacy information exists (YES in S28), or proceeds to S30 in a case of determining that the legacy information does not exist (NO in S28).

In S30, the application 38 determines whether a mobile function via the mobile I/F 24 is enabled. For example, in a case where a SIM (abbreviation of Subscriber Identity Module) card is not inserted into the mobile terminal 10, in a case where the SIM card is inserted but a mobile function is disabled (e.g., in a case where a so-called airplane mode is set) and the like, the application 38 determines that the mobile function is not enabled (NO in S30), and ends the process of FIG. 6. On the other hand, in a case of determining that the mobile function is enabled (YES in S30), the application 38 proceeds to S40.

In S40, the application 38 supplies a first connection instruction including a legacy connection disconnecting instruction and the WFD connection instruction to the OS 36. The legacy connection disconnecting instruction is an instruction for requesting disconnection of the legacy connection. Upon acquiring the first connection instruction, the OS 36 sends a connection disconnecting request to the MFP 100 via the legacy I/F 20, and disconnects the legacy connection. Next, as in S50, the OS 36 executes the processes of T242 to T252 of FIG. 4. Thereby, a WFD connection is established between the mobile terminal 10 and the MFP 100, and the mobile terminal 10 participates, as a client, in the WFDNW in which the MFP 100 operates as the G/O. That is, the state where the legacy connection is established between the mobile terminal 10 and the MFP 100 is changed to the state where the WFD connection is established therebetween. When S40 ends, the process of FIG. 6 ends.

Although not shown, when the WFD connection is established in S40 or S50, the application 38 can, by using the WFD connection, send the function information request to the MFP 100 and receive the function information response from the MFP 100 (T260, T262 of FIG. 4), and can execute a communication of print data or scan data with the MFP 100 (T350 of FIG. 5).

(Specific Cases)

Figure 8:
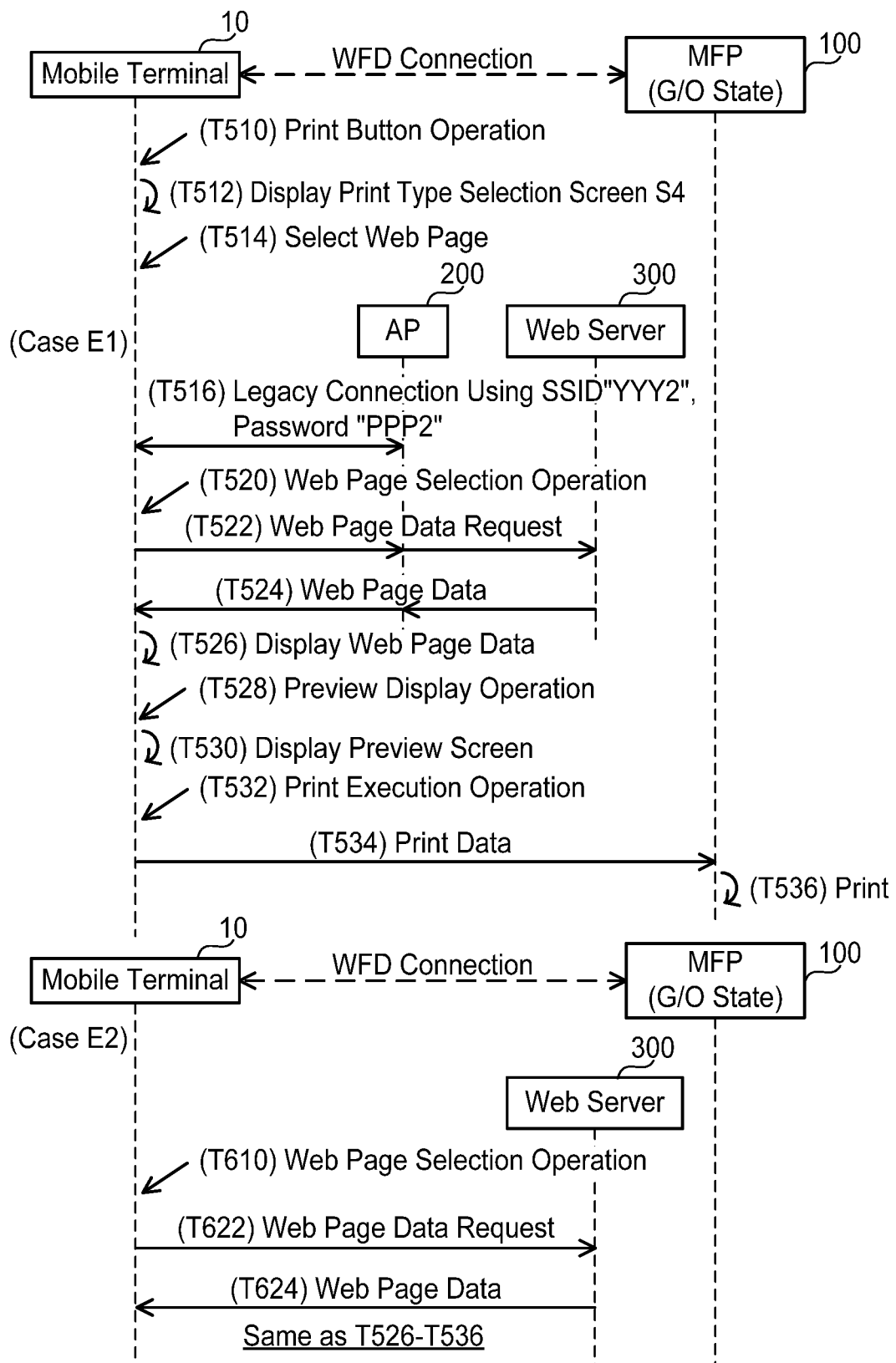
FIG. 8 shows a sequence diagram of a continuation of FIG. 7 (Cases E1, E2).
Figure 9:
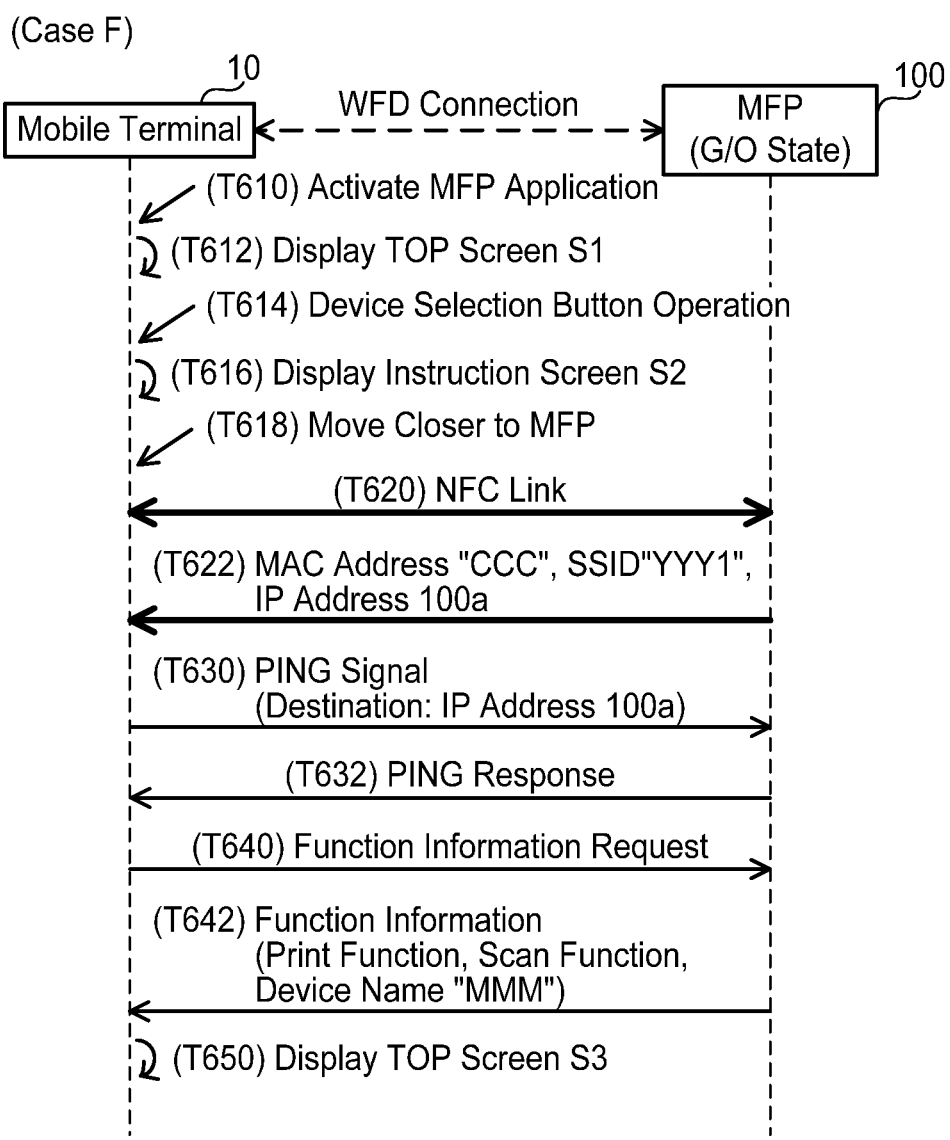
FIG. 9 shows a sequence diagram of a case F in which an NFC communication is executed under a state where a WFD connection is established between the mobile terminal and the MFP.

Next, specific cases D to F realized by the process of FIG. 6 will be described with reference to FIG. 7 to FIG. 9.

(Case D; FIG. 7)

In the case D, a legacy connection is being established between the mobile terminal 10 and the MFP 100 (see the case A of FIG. 2). Further, the legacy connection table 40 is storing first legacy information related to the legacy connection with the MFP 100 (i.e., the SSID "YYY1", the password "PPP1", and the status "Connected"), and second legacy information related to a legacy connection with the AP 200 (i.e., the SSID "YYY2", a password "PPP2", and the status "Saved"). That is, the second legacy information means that there is a record of having established a legacy connection with the AP 200 before.

T410 to T422 are the same as T210 to T222 of FIG. 4. T420 corresponds to YES in S10 of FIG. 6, and T422 corresponds to S12. In T430, the mobile terminal 10 sends a PING signal including the IP address 100*a* as the destination to the MFP 100 via each of the legacy I/F 20 and the WFD I/F 22 (S20). In this case, in T432, the mobile terminal 10 receives a PING response from the MFP 100 via the legacy I/F 20 (YES in S22).

Next, the mobile terminal 10 executes each determination process from S24 onward of FIG. 6. Firstly, the mobile terminal 10 determines that the preview screen S6 is not being displayed (NO in S24). Next, the mobile terminal 10 determines that the first legacy information including the status "Connected" exists in the legacy connection table 40, determines that the SSID "YYY1" included in the first legacy information and the SSID "YYY1" received in T422 are identical, and consequently determines that the legacy connection is being established (YES in S26). Next, the mobile terminal 10 determines that the second legacy information including the status "Saved" exists in the legacy connection table 40 (YES in S28). As a result, the mobile terminal 10 executes the process for switching the legacy connection with the MFP 100 to a WFD connection (S40). Specifically, the processes described below are executed.

In T440, the mobile terminal 10 disconnects the legacy connection with the MFP 100. At this occasion, the mobile terminal 10 changes the status included in the first legacy information in the legacy connection table 40 from "Connected" to "Saved". T450 to T480 are the same as T240 to T270 of FIG. 4. Thereby, a WFD connection is established between the mobile terminal 10 and the MFP 100(S40).

(Effect of Case D)

A situation is assumed where the user of the mobile terminal 10 wishes to access the Internet 4 under a state where a legacy connection not via the AP 200 is established between the mobile terminal 10 and the MFP 100. Under the state where the legacy connection is established with the MFP 100, the mobile terminal 10 cannot establish a legacy connection with the AP 200 to access the Internet 4. Therefore, in the present embodiment, in a case where an NFC link with the MFP 100 is established under the state where the legacy connection with the MFP 100 is established (T420 of FIG. 7), the mobile terminal 10 disconnects the legacy connection with the MFP 100 (T440), and establishes a WFD connection with the MFP 100 (T462). By moving the mobile terminal 10 closer to the MFP 100, the user can easily switch the state where the legacy connection is established between the mobile terminal 10 and the MFP 100 to the state where the WFD connection is established. Then, under the state where the WFD connection with the MFP 100 is established, the mobile terminal 10 can establish a legacy connection with the AP 200 and can access the Internet 4 via the AP 200. As such, under the state where the WFD connection with the MFP 100 is established, the user can access the Internet 4 and browse a web page on the web server 300.

Further, in a case where an NFC link is established under a state where the mobile terminal 10 is participating, as a legacy, in the WFDNW (T420), the MFP 100 establishes a WFD connection with the mobile terminal 10 without displaying the connection confirmation screen SS2 of FIG. 3, and causes the mobile terminal 10 to participate in the WFDNW as a client of the WFD scheme (T462). That is, in response to establishment of the NFC link, the MFP 100 switches the wireless connection between the MFP 100 and the mobile terminal 10 from the legacy connection to the WFD connection. Consequently, even without executing the selection on the connection confirmation screen SS2, the user of the mobile terminal 10 can, by moving the mobile terminal 10 closer to the MFP 100, easily switch the state where the legacy connection is established between the mobile terminal 10 and the MFP 100 to the state where the WFD connection is established.

Figure 7:
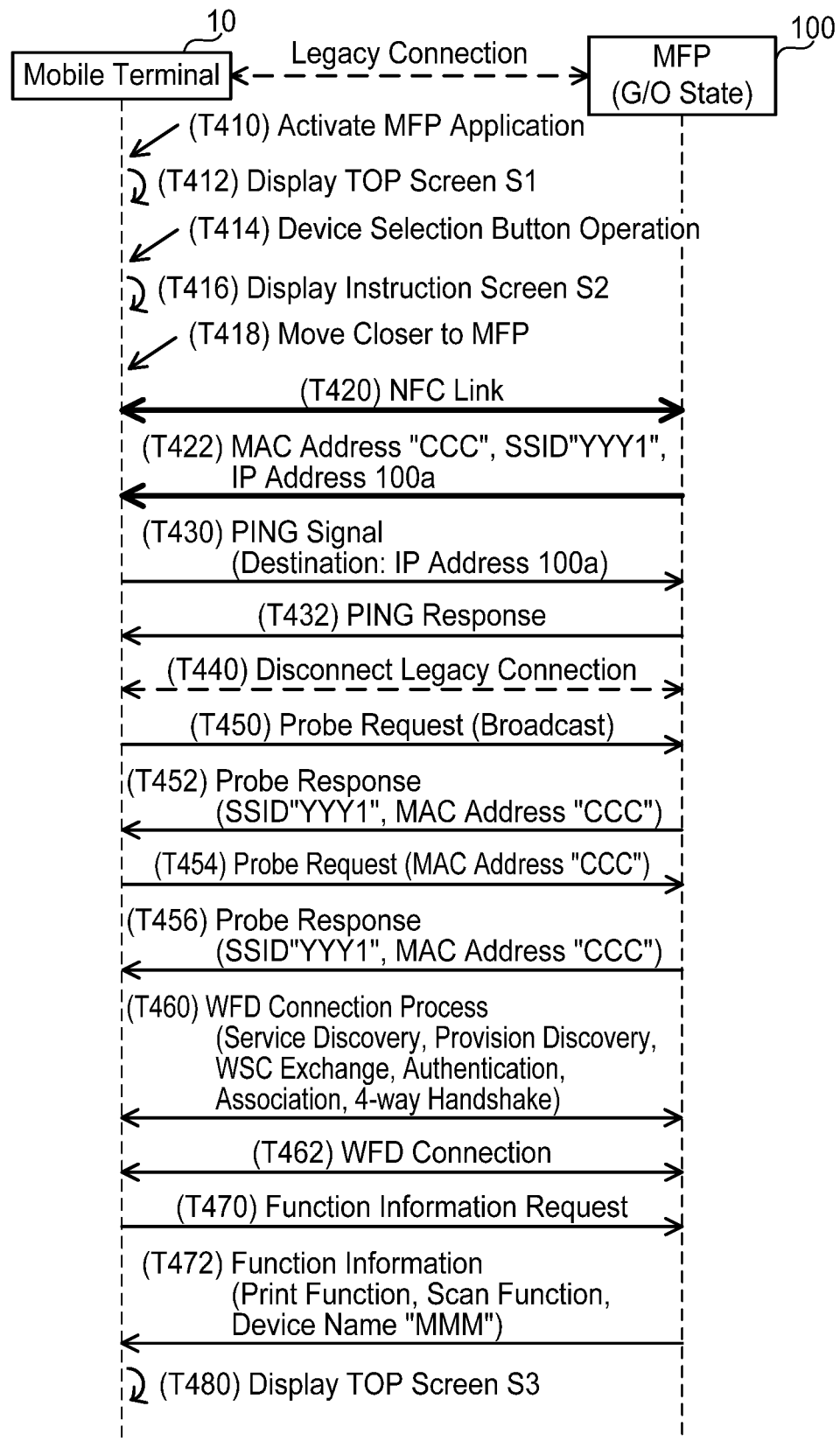
FIG. 7 shows a sequence diagram of a case D in which an NFC link is established between the MFP and the mobile terminal under a state where a legacy connection is established between the mobile terminal and the MFP.

(Continuation of Case D of FIG. 7; FIG. 8)

Next, a case that is a continuation of FIG. 7 will be described with reference to FIG. 8. An initial state of FIG. 8 is a state after execution of the process of FIG. 7, that is, a state where the WFD connection is being established between the mobile terminal 10 and the MFP 100 (T462 of FIG. 7) and the TOP screen S3 is being displayed on the mobile terminal 10 (T480). T510, T512 are respectively the same as T314, T316 of FIG. 5. In T514, the mobile terminal 10 accepts a selection of the web page button B13 (see FIG. 10(D)).

(Case E1)

Upon the legacy connection with the MFP 100 being disconnected in T440 of FIG. 7, the mobile terminal 10 attempts to establish a legacy connection with the AP 200 by using the second legacy information including the status "Saved" in the legacy connection table 40. In a case E1, a situation is assumed in which the mobile terminal 10 is located in a vicinity of the AP 200 and a legacy connection can be established between the mobile terminal 10 and the AP 200. Consequently, in T516, the mobile terminal 10 establishes a legacy connection with the AP 200 by using the SSID "YYY2" and the "PPP2" included in the second legacy information. Thereby, the mobile terminal 10 can access the Internet 4 via the AP 200.

Upon an operation for selecting a specific web page on the web server 300 being executed by the user in T520, in T522, the mobile terminal 10 sends a web page data request to the web server 300 via the AP 200 by using the legacy connection established in T516. In this case, in T524, the mobile terminal 10 receives web page data from the web server 300 via the AP 200. Then, in T526, the mobile terminal 10 displays the specific web page represented by the received web page data on the display unit 14. Upon an operation for displaying a preview screen including a print preview image of the specific web page being executed by the user in T528, in T530, the mobile terminal 10 displays the preview screen on the display unit 14. Then, when a print execution operation is executed by the user in T532, in T534, the mobile terminal 10 sends print data representing the specific web page to the MFP 100 by using the WFD connection. As a result, printing according to the print data is executed in T536.

(Effect of Case E1)

In the case where the legacy connection table 40 is storing the second legacy information including the status "Saved", there is a high possibility that the user of the mobile terminal 10 wishes to establish a legacy connection with the AP 200, not with the MFP 100. For this reason, in the present embodiment, in the case of determining that the second legacy information including the status "Saved" exists in the legacy connection table 40 (YES in S28 of FIG. 6), the mobile terminal 10 disconnects the legacy connection with the MFP 100 (T440 of FIG. 7), and establishes the WFD connection with the MFP 100 (T462). Consequently, the mobile terminal 10 can establish the legacy connection with the AP 200 (T516 of FIG. 8). As a result, the user can access the Internet 4 via the AP 200, and cause the MFP 100 to print the image represented by the specific web page data (T520 to T536).

On the other hand, in the case of determining that the legacy information including the status "Saved" does not exist in the legacy connection table 40 (NO in S28 of FIG. 6), the mobile terminal 10 disconnects the legacy connection with the MFP 100 but may not establish a WFD connection (NO in S30). This is because, in such a situation, the mobile terminal 10 cannot establish a legacy connection with a parent station different from the MFP 100 (e.g., the AP 200) without a connection operation by the user. Since the mobile terminal 10 disconnects the legacy connection with the MFP 100 but does not establish a WFD connection in a case where an access to the Internet 4 via a parent station different from the MFP 100 is not desired, a communication load and processing load of the mobile terminal 10 can be reduced.

(Case E2)

A situation is assumed in which, in the initial state of the case D of FIG. 7, the legacy connection table 40 is not storing the second legacy information related to the legacy connection with the AP 200. In this case, in the case of receiving the PING response in T432 of FIG. 7, the mobile terminal 10 determines that the legacy information including the status "Saved" does not exist (NO in S28 of FIG. 6). Here, upon determining that the mobile function is enabled (YES in S30), the mobile terminal 10 executes the processes from T440 onward of FIG. 7. A case E2 of FIG. 8 is a case after T510 to T514 have been executed in such a situation.

Upon an operation for selecting a specific web page on the web server 300 being executed by the user in T610, in T622, the mobile terminal 10 sends a web page data request to the web server 300 by using the mobile I/F 24. In this case, in T624, the mobile terminal 10 receives web page data from the web server 300 by using the mobile I/F 24. Thereafter, the same processes as T526 to T536 are executed.

(Effect of Case E2)

In the case where the mobile function is enabled in the mobile terminal 10, there is a high possibility that the user of the mobile terminal 10 is to access the Internet 4 by using the mobile I/F 24. However, under the state where the legacy connection is established between the mobile terminal 10 and the MFP 100, the mobile terminal 10 cannot access the Internet 4 via the mobile I/F 24. For this reason, in the present embodiment, in the case of determining that the mobile function is enabled (YES in S30 of FIG. 6), the mobile terminal 10 disconnects the legacy connection with the MFP 100 (T440 of FIG. 7), and establishes the WFD connection with the MFP 100 (T462). Consequently, the user can access the Internet 4 by a mobile communication, and cause the MFP 100 to print the image represented by the specific web page data (T520 to T536).

On the other hand, in the case of determining that the mobile function is not enabled (NO in S30 of FIG. 6), the mobile terminal 10 disconnects the legacy connection with the MFP 100 but does not establish a WFD connection. This is because, in such a situation, the mobile terminal 10 cannot access the Internet 4 by the mobile communication. Since the mobile terminal 10 disconnects the legacy connection with the MFP 100 but does not establish a WFD connection, the communication load and processing load of the mobile terminal 10 can be reduced.

(Case F; FIG. 9)

In a case F, a WFD connection is being established between the mobile terminal 10 and the MFP 100 in response to the WFD connection operation of T110 of FIG. 3 (see the case B of FIG. 3). A legacy connection is not being established between the mobile terminal 10 and the MFP 100. T610 to 632 are the same as T410 to 432 of FIG. 7. However, in T632, the mobile terminal 10 receives the PING response from the MFP 100 via the WFD I/F 22. Next, the mobile terminal 10 determines that the preview screen S6 is not being displayed (NO in S24 of FIG. 6), and determines that a WFD connection with the MFP 100 is being established (NO in S26). In this case, the mobile terminal 10 maintains the WFD connection with the MFP 100 without disconnecting it. T640 to T650 are the same as T470 to T480 of FIG. 7.

(Effect of Case F)

Under the state where the WFD connection with the MFP 100 is established, the mobile terminal 10 does not disconnect the WFD connection with the MFP 100 even when the NFC link with the MFP 100 is established. Thereby, the mobile terminal 10 can execute various data communications with the MFP 100 by using the WFD connection.

(Correspondence Relationships)

The mobile terminal 10, the MFP 100, and the AP 200 are an example of "terminal device", "communication device", and "access point", respectively. The NFC I/F 26, the legacy I/F 20, the WFD I/F 22, and the mobile I/F 24 are an example of "specific wireless interface", "first wireless interface", "second wireless interface", and "third wireless interface", respectively. The legacy connection or the WFD connection established between the mobile terminal 10 and the MFP 100 in the initial state of FIG. 7 or FIG. 9 is an example of "first wireless connection". The WFD connection of T462 of FIG. 7 is an example of "second wireless connection". The NFC link is an example of "specific wireless connection". The legacy scheme, the WFD scheme, and the cellular scheme are an example of "first communication scheme", "second communication scheme", and "third communication scheme", respectively.

The first connection instruction is an example of "predetermined instruction". The SSID "YYY1" is an example of "target SSID". The status "Connected", the status "Saved", the legacy information including the status "Connected", and the legacy information including the status "Saved" are an example of "first status information", "second status information", "first type history information", and "second type history information", respectively. The mobile function is an example of "predetermined function".

The WFD I/F 22 is an example of "Wi-Fi interface". The connection confirmation screen SS2 is an example of "inquiry screen". The WFDNW in which the MFP 100 operates as the G/O is an example of "target wireless network". The WFD connection of T142 of FIG. 3 and the WFD connection of T462 of FIG. 7 are an example of "first Wi-Fi connection" and "second Wi-Fi connection", respectively. The Provision Discovery request of T128 of FIG. 3 and the Provision Discovery request in T460 of FIG. 7 are an example of "first connection request", and "second connection request", respectively.

(Variant 1) The mobile terminal 10 may comprise, instead of the WFD I/F 22, a BT I/F capable of executing a wireless communication according to a Bluetooth (registered trademark) scheme. Under a state where a wireless connection is established via the BT I/F, the legacy I/F 20 can establish a legacy connection with an external device (e.g., the AP 200). In this case, in the case of receiving the PING response from the MFP 100 via the legacy I/F 20 in S22 of FIG. 6 (YES in S22), that is, in the case where a legacy connection with the MFP 100 is established, the application 38 executes the processes described below. That is, in the case of determining NO in S24, the application 38 executes S28 to S40 without executing S26. Then, in S40, the application 38 supplies, instead of the WFD connection instruction, an instruction for establishing a wireless connection via the BT I/F to the OS 136. As a result, the mobile terminal 10 disconnects the legacy connection with the MFP 100, and establishes a wireless connection via the BT I/F with the MFP 100. In the present variant, the Bluetooth scheme, the BT I/F, and the wireless connection via the BT I/F are an example of "second communication scheme", "second wireless interface", and "second wireless connection", respectively.

(Variant 2) The MFP 100 may form a wireless network by operating as a SoftAP (abbreviation of Software Access Point), instead of by operating as the G/O of the WFD scheme. In the present variant, this wireless network is an example of "target wireless network".

(Variant 3) In the above embodiment, the WFD connection for the MFP 100 operating as the G/O and the mobile terminal 10 operating as the client is established. Instead, a WFD connection for the mobile terminal 10 operating as the G/O and the MFP 100 operating as the client may be established. Generally speaking, "second wireless connection" may be a wireless connection in which the communication device operates as a parent station, or a wireless connection in which the terminal device operates as a parent station.

(Variant 4) The order of the processes S24 to S30 of FIG. 6 may be different. Further, at least one of the processes S24, S28, S30 may be omitted. That is, at least one of "determine whether second type history information exists in a memory of the terminal device", "determine whether a predetermined communication function is enabled", and "determine whether a preview screen of a print image that is to be printed by the communication device is being displayed" may be omitted.

(Variant 5) "Communication device" may not be a multi-function peripheral, but may be a printer, a scanner, a PC, a server, or the like.

What is claimed is:

1. A non-transitory computer-readable recording medium storing computer-readable instructions for a terminal device, wherein the terminal device comprises:
a specific wireless interface;
a first wireless interface different from the specific wireless interface,
the first wireless interface being configured to be incapable of establishing two or more wireless connections according to a first communication scheme simultaneously, and
the first communication scheme is for participating, as a legacy of a Wi-Fi scheme, in a target wireless network in which a communication device operates as a parent station, and
a second wireless interface different from the specific wireless interface;
wherein the first wireless interface is configured to be capable of establishing a wireless connection according to the first communication scheme under a state where a wireless connection according to a second communication scheme different from the first communication scheme is being established via the second wireless interface,
wherein the computer-readable instructions, when executed by a processor of the terminal device, cause the terminal device to:
in a case where a specific wireless connection is established between the terminal device and the communication device via the specific wireless interface under a state where a first wireless connection not via an access point is being established between the terminal device and the communication device, determine based on a table indicating information associated with the first communication scheme, whether the first wireless connection being established is a wireless connection according to the first communication scheme or a wireless connection according to the second communication scheme,
wherein the wireless connection according to the first communication scheme is established via the first wireless interface, and
the wireless connection according to the second communication scheme is established via the second wireless interface, and
a communication speed of a wireless communication via the first and second wireless interfaces is faster than a communication speed of a wireless communication via the specific wireless interface; and
supply a predetermined instruction to an OS (abbreviation of Operating System) program of the terminal device in a case where it is determined, based on the table, that the first wireless connection is the wireless connection according to the first communication scheme, the predetermined instruction includes (1) an instruction for disconnecting the first wireless connection and (2) an instruction for establishing a second wireless connection according to the second communication scheme via the second wireless interface between the terminal device and the communication device after the first wireless connection that is the wireless connection according to the first communication scheme has been disconnected,
wherein the predetermined instruction is not supplied to the OS program in a case where it is determined, based on the table, that the first wireless connection is the wireless connection according to the second communication scheme.

2. The non-transitory computer-readable recording medium as in claim 1, wherein
the first communication scheme is for participating, as the legacy of the Wi-Fi scheme, in the target wireless network in which the communication device operates as the parent station that is a G/O (abbreviation of Group Owner) of a WFD (abbreviation of Wi-Fi Direct (registered trademark)) scheme.

3. The non-transitory computer-readable recording medium as in claim 1, wherein
the second communication scheme is for participating, as a client of a WFD (abbreviation of Wi-Fi Direct (registered trademark)) scheme, in the target wireless network in which the communication device operates as the parent station that is a G/O (abbreviation of Group Owner) of the WFD scheme.

4. The non-transitory computer-readable recording medium as in claim 1, wherein
the specific wireless interface is configured to receive a target SSID (abbreviation of Service Set Identifier) from the communication device using the specific wireless connection, the target SSID being for identifying the target wireless network,
it is determined that the first wireless connection is the wireless connection according to the first communication scheme in a case where first type history information exists in a memory of the terminal device,
the first type history information is information in which first status information is associated with an SSID which is identical to the received target SSID,
the first status information indicates that the terminal device is currently participating, as the legacy of the Wi-Fi scheme, in a wireless network identified by the SSID which is identical to the received target SSID, and
it is determined that the first wireless connection is the wireless connection according to the second communication scheme in a case where the first type history information does not exist in the memory of the terminal device.

5. The non-transitory computer-readable recording medium as in claim 1, wherein
the computer-readable instructions, when executed by the processor, further cause the terminal device to:
determine whether second type history information exists in a memory of the terminal device,
wherein the second type history information is information in which second status information is associated with an SSID (abbreviation of Service Set Identifier),
the second status information indicates that the terminal device participated in a past, as the legacy of the Wi-Fi scheme, in a wireless network identified by the SSID, wherein the predetermined instruction is supplied to the OS program in a case where it is determined that the first wireless connection is the wireless connection according to the first communication scheme and it is determined that the second type history information exists in the memory, and the predetermined instruction is not supplied to the OS program in a case where it is determined that the second type history information does not exist in the memory.

6. The non-transitory computer-readable recording medium as in claim 1, wherein the computer-readable instructions, when executed by the processor, further cause the terminal device to:

determine whether a predetermined communication function is enabled, the predetermined communication function being for executing a wireless communication according to a third communication scheme different from the first and second communication schemes via a third wireless interface of the terminal device, wherein the predetermined instruction is supplied to the OS program in a case where it is determined that the first wireless connection is the wireless connection according to the first communication scheme and it is determined that the predetermined communication function is enabled, and the predetermined instruction is not supplied to the OS program in a case where it is determined that the predetermined communication function is not enabled, wherein the third wireless interface is configured to:
 be incapable of executing the wireless communication according to the third communication scheme under the state where the first wireless connection according to the first communication scheme is being established; and
 be capable of executing the wireless communication according to the third communication scheme under the state where the second wireless connection according to the second communication scheme is being established.

7. The non-transitory computer-readable recording medium as in claim 1, wherein the computer-readable instructions, when executed by the processor, further cause the terminal device to:

determine whether a preview screen of a print image that is to be printed by the communication device is being displayed on a display of the terminal device, in the case where the specific wireless connection is established under the state where the first wireless connection is being established, wherein the predetermined instruction is supplied to the OS program in a case where it is determined that the first wireless connection is the wireless connection according to the first communication scheme and it is determined that the preview screen is not being displayed on the display, and the predetermined instruction is not supplied to the OS program in a case where it is determined that the preview screen is being displayed on the display.

8. A terminal device comprising:
a specific wireless interface;
a first wireless interface different from the specific wireless interface;
a second wireless interface different from the specific wireless interface;

wherein:
 the first wireless interface being configured to be incapable of establishing two or more wireless connections according to a first communication scheme simultaneously;
 the first communication scheme is for participating, as a legacy of a Wi-Fi scheme, in a target wireless network in which a communication device operates as a parent station;
 the first wireless interface is configured to be capable of establishing a wireless connection according to the first communication scheme under a state where a wireless connection according to a second communication scheme different from the first communication scheme is being established via the second wireless interface; and
a communication speed of a wireless communication via the first and second wireless interfaces is faster than a communication speed of a wireless communication via the specific wireless interface,
a processor; and
a memory storing computer-readable instructions therein, the computer-readable instructions, when executed by the processor, causing the terminal device to:
in a case where a specific wireless connection is established between the terminal device and the communication device via the specific wireless interface under a state where a first wireless connection not via an access point is being established between the terminal device and the communication device, determine, based on a table indicating information associated with the first communication scheme, whether the first wireless connection being established is a wireless connection according to the first communication scheme or a wireless connection according to the second communication scheme,
 wherein the wireless connection according to the first communication scheme is established via the first wireless interface, and
 the wireless connection according to the second communication scheme is established via the second wireless interface; and
supply a predetermined instruction to an OS (abbreviation of Operating System) program of the terminal device in a case where it is determined, based on the table, that the first wireless connection is the wireless connection according to the first communication scheme, the predetermined instruction includes (1) an instruction for disconnecting the first wireless connection and (2) an instruction for establishing a second wireless connection according to the second communication scheme via the second wireless interface between the terminal device and the communication device after the first wireless connection that is the wireless connection according to the first communication scheme has been disconnected,
 wherein the predetermined instruction is not supplied to the OS program in a case where it is determined, based on the table, that the first wireless connection is the wireless connection according to the second communication scheme.

9. A communication device comprising:
a Wi-Fi interface configured to execute a wireless communication according to a Wi-Fi scheme;
a specific wireless interface configured to execute a wireless communication according to a communication scheme different from the Wi-Fi scheme, a communication speed of a wireless communication via the Wi-Fi interface is faster than a communication speed of a wireless communication via the specific wireless interface,
a display unit;
a processor; and
a memory storing computer-readable instructions therein, the computer-readable instructions, when executed by the processor, causing the communication device to:
in a case where a target wireless network in which the communication device operates as a parent station that is a G/O (abbreviation of Group Owner) of a WFD (abbreviation of Wi-Fi Direct (registered trademark) scheme is being formed and a terminal device is not participating, as a child station, in the target wireless network:
  receive a first connection request from the terminal device via the Wi-Fi interface, without a wireless connection via the specific wireless interface being established between the communication device and the terminal device;
in a case where the first connection request is received from the terminal device via the Wi-Fi interface, display, on the display unit, an inquiry screen for inquiring of an user whether a Wi-Fi connection via the Wi-Fi interface is to be established between the communication device and the terminal device;
in a case where it is selected by the user on the inquiry screen that the Wi-Fi connection is to be established, establish a first Wi-Fi connection via the Wi-Fi interface between the communication device and the terminal device so as to cause the terminal device to participate in the target wireless network as a client of the WFD scheme,
wherein in a case where it is not selected by the user on the inquiry screen that the Wi-Fi connection is to be established, the first Wi-Fi connection is not established; and
in a case where the target wireless network in which the communication device operates as the parent station that is the G/O is being formed and the terminal device is participating, as the legacy of the Wi-Fi scheme, in the target wireless network:
  establish a specific wireless connection with the communication device via the specific wireless interface;
  after the terminal device has seceded from the target wireless network in response to the specific wireless connection being established, receive a second connection request from the terminal device via the Wi-Fi interface; and
in a case where the second connection request from the terminal device, establish a second Wi-Fi connection via the Wi-Fi interface between the communication device and the terminal device without displaying the inquiry screen so as to cause the terminal device to participate in the target wireless network as a client of the WFD scheme, in a case where a second connection request is received from the terminal device via the Wi-Fi interface after the terminal device has seceded from the target wireless network due to an establishment of the specific wireless connection via the specific wireless interface between the communication device and the terminal device.

* * * * *